US012675593B2

(12) United States Patent
Gemmill et al.

(10) Patent No.: US 12,675,593 B2
(45) Date of Patent: Jul. 7, 2026

(54) UNIVERSAL DATA TRANSMISSION TO MULTIPLE CLOUD STORAGE PLATFORMS

(71) Applicant: HONEYWELL INTERNATIONAL INC., Charlotte, NC (US)

(72) Inventors: Craig Gemmill, Montpelier, VA (US); Norman Beekwilder, McKenney, VA (US); John Ritz, Richmond, VA (US); Radu Siminiceanu, Glen Allen, VA (US); Kevin Smith, Mechanicsville, VA (US); Daniil Sokolov, Fairfax, VA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 109 days.

(21) Appl. No.: 18/510,692

(22) Filed: Nov. 16, 2023

(65) Prior Publication Data

US 2025/0165630 A1      May 22, 2025

(51) Int. Cl.
H04L 67/1097 (2022.01)
G06F 21/62 (2013.01)
H04L 9/40 (2022.01)

(52) U.S. Cl.
CPC .......... G06F 21/6218 (2013.01); H04L 63/08 (2013.01); H04L 63/166 (2013.01); H04L 67/1097 (2013.01)

(58) Field of Classification Search
None
See application file for complete search history.

(56) References Cited

U.S. PATENT DOCUMENTS

| | | | |
|---|---|---|---|
| 2012/0221696 A1* | 8/2012 | Ferris ...................... | H04L 67/10 709/223 |
| 2015/0134817 A1* | 5/2015 | Edwards ................. | H04L 47/70 709/225 |
| 2016/0292193 A1* | 10/2016 | Madanapalli ....... | G06F 21/6218 |
| 2017/0098096 A1* | 4/2017 | Redberg ................ | H04L 9/0631 |
| 2019/0182322 A1* | 6/2019 | Kumar ................... | G06F 3/067 |
| 2021/0359881 A1* | 11/2021 | Nasu ....................... | H04L 67/34 |
| 2023/0114232 A1* | 4/2023 | Purusothaman ...... | H04L 63/062 709/223 |
| 2024/0048529 A1* | 2/2024 | Wei ..................... | H04L 63/0272 |

* cited by examiner

*Primary Examiner* — Joshua Joo

(57) ABSTRACT

Techniques for universal data transmission to multiple cloud storage platforms are described. A universal data transmission system includes a data integration framework, a set of serializers, a plurality of authenticators, a plurality of transports, and a cloud connection service. The cloud connection service is capable of loading the data from an on-premise device to each of the plurality of cloud storage platforms. The cloud connection service receives a selection of a cloud storage platform for the cloud connection service to load the data and configures a plurality of channels based on the category of the collected data and the selected cloud storage platform to a specific configuration. The cloud connection service selects a specific serializer, a specific authenticator, and a specific transport, which are pluggable to form the transmission route connecting the on-premise device to the selected cloud storage platform.

20 Claims, 10 Drawing Sheets

CLOUD CONNECTION SERVICE 106

CHANNEL CONFIGURING ENGINE 304

SERIALIZER SELECTING ENGINE 306

AUTHENTICATOR SELECTING ENGINE 308

TRANSPORT POINT SELECTING ENGINE 310

Figure 6A:
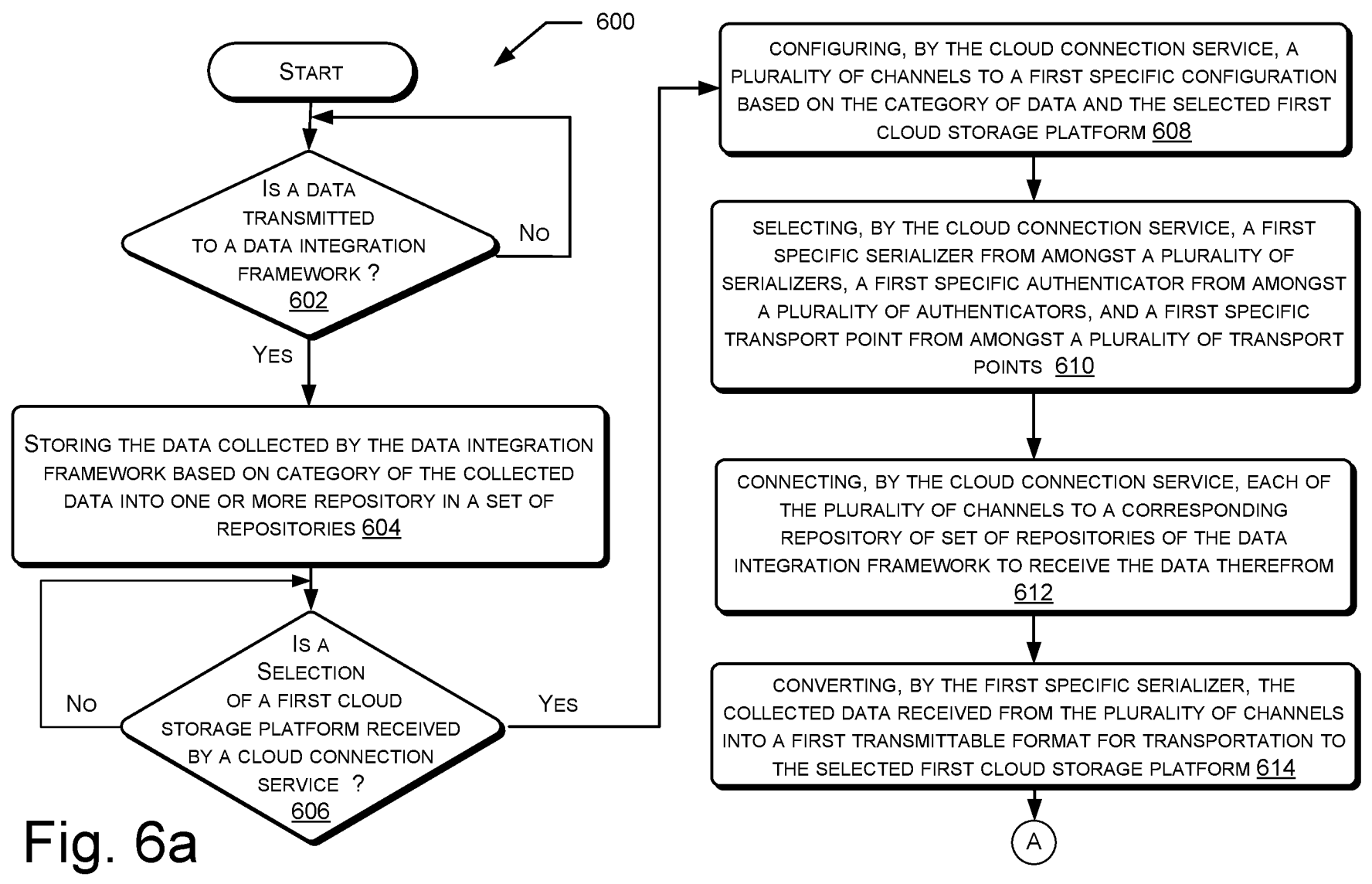

CONFIGURING, BY THE CLOUD CONNECTION SERVICE, A PLURALITY OF CHANNELS TO A FIRST SPECIFIC CONFIGURATION BASED ON THE CATEGORY OF DATA AND THE SELECTED FIRST CLOUD STORAGE PLATFORM 608

SELECTING, BY THE CLOUD CONNECTION SERVICE, A FIRST SPECIFIC SERIALIZER FROM AMONGST A PLURALITY OF SERIALIZERS, A FIRST SPECIFIC AUTHENTICATOR FROM AMONGST A PLURALITY OF AUTHENTICATORS, AND A FIRST SPECIFIC TRANSPORT POINT FROM AMONGST A PLURALITY OF TRANSPORT POINTS 610

CONNECTING, BY THE CLOUD CONNECTION SERVICE, EACH OF THE PLURALITY OF CHANNELS TO A CORRESPONDING REPOSITORY OF SET OF REPOSITORIES OF THE DATA INTEGRATION FRAMEWORK TO RECEIVE THE DATA THEREFROM 612

CONVERTING, BY THE FIRST SPECIFIC SERIALIZER, THE COLLECTED DATA RECEIVED FROM THE PLURALITY OF CHANNELS INTO A FIRST TRANSMITTABLE FORMAT FOR TRANSPORTATION TO THE SELECTED FIRST CLOUD STORAGE PLATFORM 614

600

START

IS A DATA TRANSMITTED TO A DATA INTEGRATION FRAMEWORK ? 602

NO

YES

STORING THE DATA COLLECTED BY THE DATA INTEGRATION FRAMEWORK BASED ON CATEGORY OF THE COLLECTED DATA INTO ONE OR MORE REPOSITORY IN A SET OF REPOSITORIES 604

IS A SELECTION OF A FIRST CLOUD STORAGE PLATFORM RECEIVED BY A CLOUD CONNECTION SERVICE ? 606

NO

YES

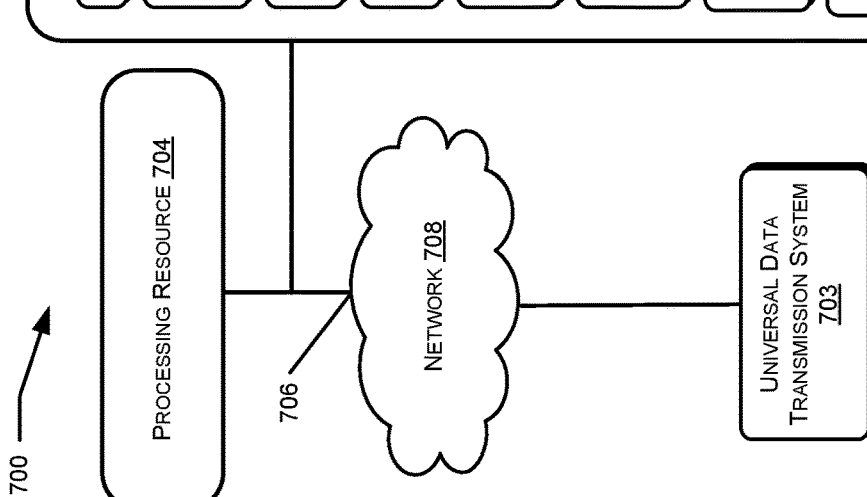

COMPUTER READABLE MEDIUM 702

INSTRUCTIONS TO COLLECT, BY A DATA INTEGRATION FRAMEWORK, DATA FROM AN ON-PREMISE DEVICE 712

INSTRUCTIONS TO STORE, BY THE DATA INTEGRATION FRAMEWORK, THE DATA, BASED ON THE CATEGORY OF THE COLLECTED DATA, INTO ONE OR MORE REPOSITORIES IN A SET OF REPOSITORIES OF THE DATA INTEGRATION FRAMEWORK 714

INSTRUCTIONS TO RECEIVE, BY A CLOUD CONNECTION SERVICE, A SELECTION OF A FIRST CLOUD STORAGE PLATFORM TO LOAD THE COLLECTED DATA 716

INSTRUCTIONS TO LINK AN ASSOCIATED MESSAGING PROTOCOL OF THE CLOUD CONNECTION SERVICE TO A MESSAGING PROTOCOL OF THE SELECTED FIRST CLOUD STORAGE PLATFORM 718

INSTRUCTIONS TO CONFIGURE, BY THE CLOUD CONNECTION SERVICE, A PLURALITY OF CHANNELS TO A FIRST SPECIFIC CONFIGURATION BASED ON THE CATEGORY OF DATA AND THE SELECTED FIRST CLOUD STORAGE PLATFORM 720

INSTRUCTIONS TO SELECT, BY THE CLOUD CONNECTION SERVICE, A FIRST SPECIFIC SERIALIZER FROM AMONGST A PLURALITY OF SERIALIZERS, A FIRST SPECIFIC AUTHENTICATOR FROM AMONGST A PLURALITY OF AUTHENTICATORS, AND A FIRST SPECIFIC TRANSPORT POINT FROM AMONGST A PLURALITY OF TRANSPORT POINTS 722

INSTRUCTIONS TO CONVERT, BY THE FIRST SPECIFIC SERIALIZER, THE COLLECTED DATA RECEIVED FROM THE PLURALITY OF CHANNELS INTO A FIRST TRANSMITTABLE FORMAT FOR TRANSPORTATION TO THE SELECTED FIRST CLOUD STORAGE PLATFORM 726

INSTRUCTIONS TO SECURE, BY THE FIRST SPECIFIC AUTHENTICATOR, THE CONVERTED DATA RECEIVED FROM THE FIRST SPECIFIC SERIALIZER TO GENERATE A FIRST PROTECTED DATA TO PREVENT UNAUTHORIZED ACCESS OF THE DATA 728

PROCESSING RESOURCE 704

706

NETWORK 708

UNIVERSAL DATA TRANSMISSION SYSTEM 703

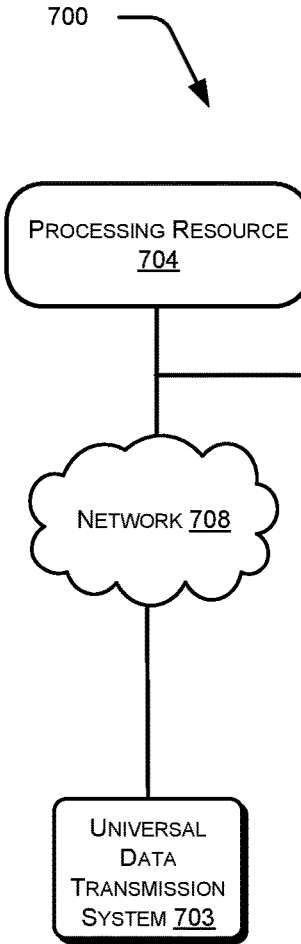

PROCESSING RESOURCE
704

NETWORK 708

UNIVERSAL
DATA
TRANSMISSION
SYSTEM 703

COMPUTER READABLE MEDIUM 702

INSTRUCTIONS TO TRANSPORT, BY THE FIRST SPECIFIC TRANSPORT POINT, THE FIRST PROTECTED DATA 730

INSTRUCTIONS TO RECEIVE, BY USING THE FIRST CLOUD STORAGE PLATFORM, THE FIRST PROTECTED DATA 732

INSTRUCTIONS TO RECEIVE, BY THE CLOUD CONNECTION SERVICE, A SELECTION OF A SECOND CLOUD STORAGE PLATFORM FROM THE PLURALITY OF CLOUD STORAGE PLATFORMS FOR THE CLOUD CONNECTION SERVICE TO LOAD THE COLLECTED DATA 734

INSTRUCTIONS TO LINK THE ASSOCIATED MESSAGING PROTOCOL OF THE CLOUD CONNECTION SERVICE TO A MESSAGING PROTOCOL OF THE SELECTED SECOND CLOUD STORAGE PLATFORM 736

INSTRUCTIONS TO RE-CONFIGURE, BY THE CLOUD CONNECTION SERVICE, THE PLURALITY OF CHANNELS TO A SECOND SPECIFIC CONFIGURATION BASED ON THE CATEGORY OF DATA AND THE SELECTED SECOND CLOUD STORAGE PLATFORM 738

INSTRUCTIONS TO SELECT, BY THE CLOUD CONNECTION SERVICE, A SECOND SPECIFIC SERIALIZER FROM AMONGST THE PLURALITY OF SERIALIZERS, A SECOND SPECIFIC AUTHENTICATOR FROM AMONGST THE PLURALITY OF AUTHENTICATORS, AND A SECOND SPECIFIC TRANSPORT POINT FROM AMONGST THE PLURALITY OF TRANSPORT POINTS 740

INSTRUCTIONS TO RECEIVE, BY THE PLURALITY OF CHANNELS, COLLECTED DATA FROM THE CORRESPONDING REPOSITORY 742

INSTRUCTIONS TO CONVERT, BY THE SECOND SPECIFIC SERIALIZER, THE COLLECTED DATA RECEIVED FROM THE PLURALITY OF CHANNELS INTO A SECOND TRANSMITTABLE FORMAT FOR TRANSPORTATION TO THE SELECTED SECOND CLOUD STORAGE PLATFORM 744

INSTRUCTIONS TO SECURE, BY THE SECOND SPECIFIC AUTHENTICATOR, THE CONVERTED DATA RECEIVED FROM THE SECOND SPECIFIC SERIALIZER TO GENERATE A SECOND PROTECTED DATA TO PREVENT UNAUTHORIZED ACCESS OF THE DATA 746

INSTRUCTIONS TO TRANSPORT, BY THE SECOND SPECIFIC TRANSPORT POINT, THE SECOND PROTECTED DATA 748

INSTRUCTIONS TO RECEIVE, BY THE SELECTED SECOND CLOUD STORAGE PLATFORM, THE SECOND PROTECTED DATA 750

Fig. 7b

UNIVERSAL DATA TRANSMISSION TO MULTIPLE CLOUD STORAGE PLATFORMS

BACKGROUND

Generally, organizations may employ devices, such as Internet-of-Things (IoT)-based sensors, IoT-based electrical appliances, IoT-based cameras, and the like, installed on their premises (i.e., at a facility, such as a warehouse of the organization) for various purposes. For instance, a manufacturing unit may include IoT-based sensors to capture different data parameters required for gauging quality of a manufactured product and/or to monitor operating environment of the product that is to be manufactured. Such data may have to be stored so that it can be used and processed, at a later stage, for deriving insights therefrom or for other types of subsequent analyses.

In certain cases, the data may be stored locally, for instance, on the premises, in a server to perform processing of the data at a later stage. In certain other cases, for instance, when the data generated by the on-premise devices is in large amounts and/or for cost reduction in operation and maintenance of local devices, instead of storing the data locally, the data may be stored on a remote device, such as a cloud storage platform. In this regard, the data may be transmitted from the on-premise devices to the cloud storage platform through a network, such as Local Area network (LAN), Wide Area Network (WAN), intranet, internet, wireless access networks, mobile networks, the like. The cloud storage platform may provide, in addition to storage resources, computing resources to perform different operations on the stored data. In some cases, a single cloud storage platform may be used for performing all the activities. In certain other cases, services across different cloud storage platforms are generally desired due to various reasons. However, to connect to different cloud storage platforms, different service architectures, such as authentication, serialization, and transport mechanisms, may be required.

SUMMARY

In accordance with the present subject matter, a Universal Data Transmission (UDT) may enable storage of data at a plurality of cloud storage platforms. The plurality of cloud storage platforms may be, for example, a private cloud platform, a public cloud platform, a hybrid cloud platform, a community cloud platform, or a combination thereof.

The UDT system may include a data integration framework, a set of serializers, a plurality of authenticators, a plurality of transports, and a cloud connection service. The data integration framework may be operably connected to an on-premise device. The data integration framework may be, for example, a common object model framework. The data integration framework may collect the data from the on-premise device. The data integration framework may store the data into one or more repositories in the set of repositories based on the category of the collected data.

The repository may be, for example, a point repository, a history repository, an alarm repository, a model repository, an event repository, a heartbeat repository, a messaging repository, or a back-up repository. The point repository may store live data of the on-premise device. The history repository may store an historical collection of the live data of the on-premise device. The alarm repository may store an abnormal event associated with the on-premise device. The model repository may store data that is to represent a semantic model of the plurality of cloud storage platforms.

The event repository may store data corresponding to events other than abnormal event associated with the on-premise device. The heartbeat repository may store data corresponding to health information of the on-premise device. The messaging repository may store data corresponding to an arbitrary message from the on-premise device. The back-up repository may store back-up data corresponding to the on-premise device.

The plurality of authenticators may secure the converted data to generate a protected data to prevent unauthorized access of the data. Each of the plurality of transports may transmit the protected data to the plurality of cloud storage platforms in a transport protocol.

The UDT system may enable transmission of the data to any of the plurality of cloud storage platforms without having to rebuild the service architecture. In this regard, the cloud connection service may be operationally coupled to the data integration framework and to a plurality of cloud storage platforms. The cloud connection service may be capable of loading the collected data to each of the plurality of cloud storage platforms. The cloud connection service may receive a selection of a cloud storage platform from the plurality of cloud storage platforms for the cloud connection service to load the collected data. In an example, the cloud connection service has an associated messaging protocol that is linked to a messaging protocol of the selected cloud storage platform.

The cloud connection service may configure a plurality of channels based on the category of the collected data and the selected cloud storage platform to a specific configuration. The specific configuration of the plurality of channels may indicate a transmission route for the transmission of the collected data from the on-premise device to the selected cloud storage platform. Each of the plurality of channels being connected to a corresponding repository from the set of repositories.

The cloud connection service may select a specific serializer from amongst the set of serializers, a specific authenticator from the plurality of authenticators, and a specific transport from amongst the plurality of transports. The specific serializer, the specific authenticator, and the specific transport may be pluggable to form the transmission route connecting the on-premise device to the selected cloud storage platform.

In an example, the specific serializer may be selectable by each of the plurality of channels. The specific serializer may convert the data received from its corresponding channel into a transmittable format for transportation to the selected cloud storage platform. The specific authenticator may be selectable by the specific serializer. The specific authenticator may secure the converted data received from the specific serializer to generate first protected data. The specific transport may be selectable by the specific authenticator. The specific transport may transmit the protected data received from the specific authenticator to the selected cloud storage platform.

Each of the specific authenticator, the specific serializer, and the specific transport may include an interface to communicate with the cloud communication service and thereby, to enable determination of the specific configuration of the plurality of channels. The specific authenticator, the specific serializer, and the specific transport may enable transmission of the data to the selected cloud storage platform based on the specific configuration of the plurality of channels. The interface may be, for example, a Java-based interface.

In an example, the UDT may enable transmission of data from on-premise device to a plurality of cloud storage platforms, for example, to a first cloud storage platform and a second cloud storage platform. In this regard, data from an on-premise device may be transmitted to the data integration framework. The data collected from the data may be stored by the data integration framework into the one or more repository in the set of repositories based on the category of the collected data.

The cloud connection service may receive a selection of a first cloud storage platform from a plurality of cloud storage platforms for the cloud connection service to load the collected data. The cloud connection service may configure a plurality of channels to a first specific configuration based on the category of data and the selected first cloud storage platform. The first specific configuration may indicate a first transmission route for transportation of the collected data from the on-premise device to the selected first cloud storage platform. The cloud connection service may select a first specific serializer from amongst a plurality of serializers, a first specific authenticator from amongst a plurality of authenticators, and a first specific transport from amongst a plurality of transports. The first specific serializer, the first specific authenticator, and the first specific transport may be pluggable to form the first transmission route connecting the on-premise device to the selected first cloud storage platform. The cloud connection service may connect each of the plurality of channels to a corresponding repository of set of repositories of the data integration framework to receive the data therefrom. Each of the first plurality of channels may transmit the collected data received from its corresponding repository. The first specific serializer may convert the collected data received from the plurality of channels into a first transmittable format for transportation to the selected first cloud storage platform. The first specific serializer may transmit the converted data to the first specific authenticator. The first specific authenticator may secure the converted data received from the first specific serializer to generate a first protected data to prevent unauthorized access of the data. The first specific authenticator may transmit the first protected data to the first specific transport. The first specific transport may transport the first protected data. The selected first cloud storage platform may receive the first protected data from the first specific transport.

Subsequently, when the data is be transmitted to a second cloud storage platform of the plurality of cloud storage platforms, the cloud connection service may receive a selection of a second cloud storage platform for the cloud connection service to load the collected data. The cloud connection service may re-configure the plurality of channels to a second specific configuration based on the category of data and the selected second cloud storage platform. The second specific configuration may to indicate a second specific transmission route for transportation of the collected data from the on-premise device to the selected second cloud storage platform. In an aspect, prior to the reconfiguration of the plurality of channels, an associated messaging protocol of the selected second cloud storage platform may be linked with the associated messaging protocol of the cloud connection service.

The cloud connection service may select a second specific serializer from amongst the plurality of serializers, a second specific authenticator from amongst the plurality of authenticators, and a second specific transport from amongst the plurality of transports. The second specific serializer, the second specific authenticator, and the second specific transport may be pluggable to form the second specific transmission route connecting the on-premise device to the selected second cloud storage platform. The plurality of channels may receive the collected data from the corresponding repository. The second specific serializer may convert the collected data received from the plurality of channels into a second transmittable format for transportation to the selected second cloud storage platform. The second specific serializer may transmit the converted data to the second specific authenticator. The second specific authenticator may secure the converted data received from the second specific serializer to generate a second protected data to prevent unauthorized access of the data. The second specific authenticator may transmit the second protected data to the second specific transport. The second specific transport may transport the second protected data. The selected second cloud storage platform may receive the second protected data.

With the present subject matter, the elements that are required for a specific architecture are added in a composable fashion. For instance, whichever elements are required to establish the communication from an on-premise device to a cloud storage platform are chosen and added to form the transmission route without having the re-build the service architecture. If another set of elements are required to establish communication with another cloud storage platform, another set of elements are chosen to compose the cloud connectivity solution to another cloud storage platform. The selection of various elements to establish cloud connectivity solutions to various cloud storage platforms are provided in a single design framework.

Therefore, with the present subject matter, data may be stored in variety of different cloud storage platforms without having to re-build the service architecture. Accordingly, the present subject matter fulfils various organizations' desires to use services across different cloud storage platforms. Further, the present subject matter eliminates the need for inventing higher amount of resources (cost, time, and the like) to enable communication with variety of cloud storage platforms. With the present subject matter, the process of enabling communication with different cloud storage platforms is easier and simple.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

FIGS. 6*a*-6*c* illustrate a method for universally transmitting data to a plurality of cloud storage platform, according to an example implementation of the present subject matter; and FIGS. 7a-7b illustrates a computing environment, implementing a non-transitory computer-readable medium for universally transmitting data to a plurality of cloud storage platforms, according to an example implementation of the present subject matter;

DETAILED DESCRIPTION

Figure 1:
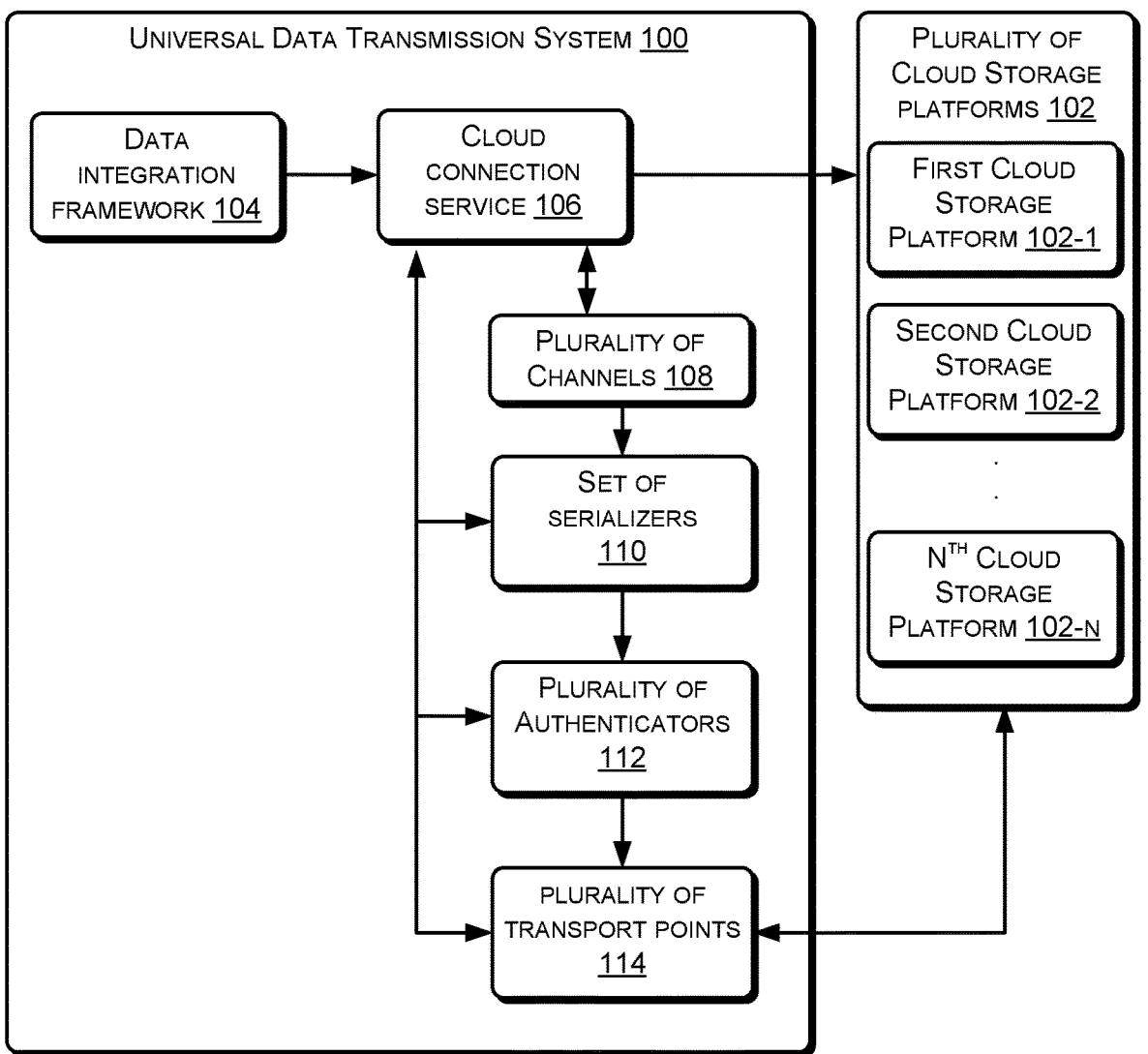
FIG. 1 illustrates a block diagram of a Universal Data Transmission (UDT) system, according to an example implementation of the present subject matter.

Conventionally, processing and storage of data from various devices, such as Internet-of-Things (IoT)-based sensors, IoT-based electrical appliances, IoT-based cameras, and the like, installed on the premises of the organizations (i.e., at a location of the organizations) may be performed by a single cloud storage platform. However, services across different cloud storage platforms are desired due to various reasons, such as cost optimization, changes in existing offering the cloud storage platforms provide, back-up of data to deal with downtime or crashing of data, and the like. For instance, to have an efficient back-up and an efficient retrieval of data, data from a first sensor may be stored in a first cloud storage platform and in a second cloud storage platform.

Further, in some cases, different on-premise devices may generate different kinds of data. For instance, assume that a first set of sensors are to sense data corresponding to health of one type of machine. Further, assume that a second set of sensors are to monitor parameters, such as temperature and pressure, corresponding to a manufacturing environment of manufacturing a product. In such cases, organizations may desire having one cloud platform to store a kind of data and another cloud platform to store another kind of data. For example, organizations may require storing of the data from the first set of sensors in the first cloud platform and the data from the second set of sensors in the second cloud platform.

In some scenarios, different units of an organization may require different requirements for the storage and the processing of the data and may, therefore, use a specific cloud storage platform for storage and processing of the data. Therefore, to meet the requirements of the various units of the organization, customized services corresponding to each unit of the organization may have to be utilized. Accordingly, various organizations may have to invest to develop the customized services. Similarly, in certain scenarios, an organization may use a specific cloud storage platform for storage and processing of the data. However, if there are various organizations corresponding to a same group, the group may have to invest significant amount of resources in developing the customized services corresponding to each of these organizations.

To enable communication of an on-premise device with a particular cloud storage platform, a particular service architecture, including authentication, transport mechanisms, application layers communication path, and the like, is to be implemented and used. For instance, assume that data from the first set of sensors is to be stored in a cloud storage platform "A" and the transmission of data from the first sensor to the cloud storage platform "A" requires serialization in Javascript Object Notation (JSON), password authentication, and transportation in Message Queuing Telemetry Transport (MQTT) protocol. Therefore, to enable the communication between the first set of sensors and the cloud storage platform "A", the service architecture may be designed to perform JSON serialization of the data, perform password authentication on the serialized data, and transport using MQTT protocol.

In order to enable communication of the on-premise device with another cloud storage platform, a different architecture may have to be used. In this regard, to enable such communication with a different cloud storage platform, service architecture may have to be re-designed or newly designed. For instance, assume that data from the first set of sensors is to be stored in a cloud storage platform "B" and the transmission of data from the first set of sensors to the cloud storage platform "B" requires serialization in Extensible Markup Language (XML), Public Key Infrastructure (PKI) authentication, and transportation in Hypertext Transfer Protocol (HTTP) protocol. Therefore, to enable the communication between the first set of sensors with the cloud storage platform "B", the service architecture may have to be re-designed to perform XML serialization of the data, perform PKI authentication on the serialized data, and transport using HTTP protocol.

Accordingly, the process of enabling communication with different cloud storage platforms difficult, cumbersome, expensive, and time-consuming. Further, the requirement of re-design of service architecture based on communication to a particular cloud storage platform makes it difficult to leverage the use of different cloud storage platforms in various combination of different services.

In accordance with the present subject matter, a Universal Data Transmission (UDT) may enable storage of data at a plurality of cloud storage platforms. The plurality of cloud storage platforms may be, for example, a private cloud platform, a public cloud platform, a hybrid cloud platform, a community cloud platform, or a combination thereof.

The UDT system may include a data integration framework, a set of serializers, a plurality of authenticators, a plurality of transports, and a cloud connection service. The data integration framework may be operably connected to an on-premise device. The data integration framework may be, for example, a common object model framework. The data integration framework may collect the data from the on-premise device. The collected data may be stored into one or more repositories in the set of repositories based on the category of the collected data.

The repository may be, for example, a point repository, a history repository, an alarm repository, a model repository, an event repository, a heartbeat repository, a messaging repository, or a back-up repository. The point repository may store live data of the on-premise device. The history repository may store an historical collection of the live data of the on-premise device. The alarm repository may store an abnormal event associated with the on-premise device. The model repository may store data that is to represent a semantic model of the plurality of cloud storage platforms. The event repository may store data corresponding to events other than abnormal event associated with the on-premise device. The heartbeat repository may store data corresponding to health information of the on-premise device. The messaging repository may store data corresponding to an arbitrary message from the on-premise device. The back-up repository may store back-up data corresponding to the on-premise device.

The set of serializers may convert the data from a corresponding channel into a transmittable format for transportation of the converted data to the plurality of cloud storage platforms. In an example, the transmittable format may be an Extensible Markup Language (XML) format, JavaScript Object Notation (JSON) format, Binary Javascript Object Notation (BSON) format, Yet Another markup Language (YAML) formal, MessagePack format, protobuf format, or a combination thereof.

The plurality of authenticators may secure the converted data to generate a protected data to prevent unauthorized access of the data. The plurality of authenticators may be, for example, a certificate-based authenticator, a Raw Public Key (RPK)-based authenticator, a password-based authenticator, a multi-factor authenticator, or a combination thereof.

Each of the plurality of transports may transmit the protected data to the plurality of cloud storage platforms in a transport protocol. The transport protocol may be one of: Message Queuing Telemetry Transport (MQTT) protocol, Hyper Text Transfer Protocol (HTTP), Advanced Message Queuing Protocol (AMQP), Data Distributed Service (DDS) protocol, Extensible Messaging and Presence Protocol (XMPP), and Constrained Application Protocol (CoAP).

The UDT system may enable transmission of the data to any of the plurality of cloud storage platforms without having to rebuild the service architecture. In this regard, the cloud connection service may be operationally coupled to the data integration framework and to a plurality of cloud storage platforms. The cloud connection service may be capable of loading the collected data to each of the plurality of cloud storage platforms. The cloud connection service may receive a selection of a cloud storage platform from the plurality of cloud storage platforms for the cloud connection service to load the collected data. In an example, the cloud connection service has an associated messaging protocol that is linked to a messaging protocol of the selected cloud storage platform.

The cloud connection service may configure a plurality of channels based on the category of the collected data and the selected cloud storage platform to a specific configuration. The specific configuration of the plurality of channels may indicate a transmission route for the transmission of the collected data from the on-premise device to the selected cloud storage platform. Each of the plurality of channels being connected to a corresponding repository from the set of repositories.

In an example, the plurality of channels may include a point channel, history channel, an alarm channel, a command channel, a model channel, an event channel, a heartbeat channel, a messaging channel, a back-up channel, or a schedule channel. The point channel may enable delivery of live data of the on-premise device. The history channel may enable delivery of a historical collection of the live data of the on-premise device. The alarm channel may enable delivery of data corresponding to an abnormal event associated with the on-premise device. The command channel may receive and process commands from the plurality of cloud storage platforms. The model channel may represent the semantic model to the plurality of cloud storage platforms. The event channel may enable delivery of data corresponding to events other than abnormal event associated with the on-premise device. The heartbeat channel may enable delivery of data corresponding to health information of the on-premise device. The messaging channel may enable delivery of arbitrary message and the back-up channel may enable delivery of back-up of data corresponding to the on-premise device. The plurality of channels may include a schedule channel for synchronizing schedule and calendar configurations from the on-premise device up to the plurality of cloud storage platforms for visualization and configuration.

The cloud connection service may select a specific serializer from amongst the set of serializers, a specific authenticator from the plurality of authenticators, and a specific transport from amongst the plurality of transports. The specific serializer, the specific authenticator, and the specific transport may be pluggable to form the transmission route connecting the on-premise device to the selected cloud storage platform.

In an example, the specific serializer may be selectable by each of the plurality of channels. The specific serializer may convert the data received from its corresponding channel into a transmittable format for transportation to the selected cloud storage platform. The specific authenticator may be selectable by the specific serializer. The specific authenticator may secure the converted data received from the specific serializer to generate first protected data. The specific transport may be selectable by the specific authenticator. The specific transport may transmit the protected data received from the specific authenticator to the selected cloud storage platform.

Each of the specific authenticator, the specific serializer, and the specific transport may include an interface to communicate with the cloud communication service and thereby, to enable determination of the specific configuration of the plurality of channels. The specific authenticator, the specific serializer, and the specific transport may enable transmission of the data to the selected cloud storage platform based on the specific configuration of the plurality of channels. The interface may be, for example, a Java-based interface.

In an example, the UDT may enable transmission of data from on-premise device to a plurality of cloud storage platforms, for example, to a first cloud storage platform and a second cloud storage platform. In this regard, data from an on-premise device may be transmitted to the data integration framework. The data collected from the data may be stored by the data integration framework into the one or more repository in the set of repositories based on the category of the collected data.

The cloud connection service may receive a selection of a first cloud storage platform from a plurality of cloud storage platforms for the cloud connection service to load the collected data. The cloud connection service may configure a plurality of channels to a first specific configuration based on the category of data and the selected first cloud storage platform. The first specific configuration may indicate a first transmission route for transportation of the collected data from the on-premise device to the selected first cloud storage platform. In an aspect, prior to the configuration of the plurality of channels, an associated messaging protocol of the selected first cloud storage platform may be linked with the associated messaging protocol of the cloud connection service.

The cloud connection service may select a first specific serializer from amongst a plurality of serializers, a first specific authenticator from amongst a plurality of authenticators, and a first specific transport from amongst a plurality of transports. The first specific serializer, the first specific authenticator, and the first specific transport may be pluggable to form the first transmission route connecting the on-premise device to the selected first cloud storage platform. The cloud connection service may connect each of the plurality of channels to a corresponding repository of set of repositories of the data integration framework to receive the data therefrom.

Each of the first plurality of channels may transmit the collected data received from its corresponding repository to the first specific serializer. The first specific serializer may convert the collected data received from the plurality of channels into a first transmittable format for transportation to the selected first cloud storage platform.

In an example, the first specific serializer may determine the first specific configuration of the plurality of channels from the cloud connection service. The first specific serializer may select the first specific authenticator based on the first specific configuration of the plurality of channels. The first specific serializer may transmit the converted data to the first specific authenticator.

The first specific authenticator may secure the converted data received from the first specific serializer to generate a first protected data to prevent unauthorized access of the data. The first specific authenticator may transmit the first protected data to the first specific transport.

In an example, prior to the transmission of the first protected data to the first specific transport, the first specific authenticator may determine the first specific configuration of the plurality of channels using the cloud connection service. The first specific authenticator may select the first specific transport based on the first configuration of the plurality of channels.

The first specific transport may transport the first protected data. The selected first cloud storage platform may receive the first protected data from the first specific transport.

In an example, to transmit the first protected data to the selected first cloud storage platform, the first specific transport may determine the first specific configuration of the plurality of channels from the cloud connection service. The first specific transport may transmit the first protected data to the first specific cloud storage platform based on the first specific configuration of the plurality of channels.

Subsequently, when the data is be transmitted to a second cloud storage platform of the plurality of cloud storage platforms, the cloud connection service may receive the selection of a second cloud storage platform for the cloud connection service to load the collected data. The cloud connection service may re-configure the plurality of channels to a second specific configuration based on the category of data and the selected second cloud storage platform. The second specific configuration may to indicate a second specific transmission route for transportation of the collected data from the on-premise device to the selected second cloud storage platform. In an aspect, prior to the reconfiguration of the plurality of channels, an associated messaging protocol of the selected second cloud storage platform may be linked with the associated messaging protocol of the cloud connection service.

The cloud connection service may select a second specific serializer from amongst the plurality of serializers, a second specific authenticator from amongst the plurality of authenticators, and a second specific transport from amongst the plurality of transports. The second specific serializer, the second specific authenticator, and the second specific transport may be pluggable to form the second specific transmission route connecting the on-premise device to the selected second cloud storage platform. The plurality of channels may receive the collected data from the corresponding repository. Each of the plurality of channels may transmit the collected data to the second specific serializer. The second specific serializer may convert the collected data received from the plurality of channels into a second transmittable format for transportation to the selected second cloud storage platform.

In an example, the second specific serializer may determine the second specific configuration of the plurality of channels from the cloud connection service. The second specific serializer may select the second specific authenticator based on the second specific configuration of the plurality of channels. The second specific serializer may transmit the converted data to the second specific authenticator.

10

The second specific authenticator may secure the converted data received from the second specific serializer to generate a second protected data to prevent unauthorized access of the data. The second specific authenticator may transmit the second protected data to the second specific transport.

In an example, the second specific authenticator may determine the second specific configuration of the plurality of channels using the cloud connection service. The second specific authenticator may select the second specific transport based on the second configuration of the plurality of channels.

The second specific transport may transport the second protected data. The selected second cloud storage platform may receive the second protected data.

In an example, to transmit the second protected data to the selected second cloud storage platform, the second specific transport may determine the second specific configuration of the plurality of channels from the cloud connection service. The second specific transport may transmit the second protected data to the second specific cloud storage platform based on the second specific configuration of the plurality of channels.

Therefore, with the present subject matter, the elements that are required for a specific architecture are added in a composable fashion. For instance, whichever elements are required to establish the communication from an on-premise device to a cloud storage platform are chosen and added to form the transmission route without having the re-build the service architecture. If another set of elements are required to establish communication with another cloud storage platform, another set of elements are chosen to compose the cloud connectivity solution to another cloud storage platform. The selection of various elements to establish cloud connectivity solutions to various cloud storage platforms are provided in a single design framework.

Therefore, with the present subject matter, data may be stored in variety of different cloud storage platforms without having to re-build the service architecture. Accordingly, the present subject matter fulfils various organizations' desires to use services across different cloud storage platforms. Further, the present subject matter eliminates the need for inventing higher amount of resources (cost, time, and the like) to enable communication with variety of cloud storage platforms. With the present subject matter, the process of enabling communication with different cloud storage platforms is easier and simple.

The present subject matter is further described with reference to FIGS. 1-7b. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a Universal Data Transmission (UDT) system 100, according to an example implementation of the present subject matter. The UDT system 100 may enable transmission of data from an on-premise device to a plurality of cloud storage platforms. The on-premise device (not shown in FIG. 1) may be installed on premises (i.e., at a facility, such as a warehouse of an organization). The plurality of cloud storage platforms 102 may include a first cloud storage platform 102-1, a second cloud storage platform 102-2, . . . , n$^{th}$ cloud storage platform 102-N. The plurality of cloud storage platforms 102 may be, for example, a private cloud platform, a public cloud platform, a hybrid cloud platform, a community cloud platform, or a combination thereof.

In an example, for various reasons, the data from the on-premise device may have to be stored and processed in more than one cloud storage platforms 102, such as cost optimization, changes in existing offering the cloud storage platforms provide, back-up of data to deal with downtime or crashing of data, and the like. For instance, data of different kind may be stored in different cloud storage platforms 102. Data from one on-premise device may be stored in the first cloud storage platform 102-1 and data from another on-premise device may be stored in the second cloud storage platform 102-2. In some examples, to have an efficient back-up and retrieval of the data, same data may be stored in different cloud storage platforms 102. Data from the same on-premise device may be stored in the first cloud storage platform 102-1 as well as the second cloud storage platform 102-2. Accordingly, the UDT system 100 may enable storing of the data at the plurality of cloud storage platforms 102.

In this regard, the UDT system 100 may include a data integration framework 104. The data integration framework 104 may be operably coupled to a variety of on-premise devices to collect data from the on-premise devices to transmit the data. The data integration framework 104 may include a set of repositories (not shown in FIG. 1). Each repository may storage a category of data, as will be described with reference to FIG. 2.

The UDT system 100 may include service architecture to enable transmission of data collected at the data integration framework to the plurality of cloud storage platforms 102. In particular, the UDT system 100 may include a set of serializers 110, a plurality of authenticators 112, and a plurality of transports 114. The set of serializers 110 may convert the data into a transmittable format for transportation of the converted data to the plurality of cloud storage platforms 102. For instance, a serializer of the set of serializers 110 may convert a data object into a transmittable form, such as a byte stream, that can be used for transmitting to the plurality of cloud storage platforms 102. The plurality of authenticators 112 may secure the converted data to generate a protected data to prevent unauthorized access of the data. Each of the plurality of transports 114 may transmit the protected data to the plurality of cloud storage platforms 102 in a transport protocol.

In an example, to enable transmission of the data from the data integration framework 104 to a desired cloud storage platform from amongst the plurality of cloud storage platforms 102, the UDT system 100 may include a cloud connection service 106. The cloud connection service 106 may be operationally coupled to the data integration framework 104 and to the plurality of cloud storage platforms 102. The cloud connection service 106 may be capable of loading the data collected from the on-premise device to each of the plurality of cloud storage platforms 102. For instance, if the data may have to transmitted to the first cloud storage platform 102-1, the cloud connection service 106 may enable loading of the data to the first cloud storage platform 102-1. In this regard, the cloud connection service 106 may configure a plurality of channels 108 based on the category of the collected data and a selected cloud storage platform from amongst the plurality of cloud storage platforms 102 to a specific configuration. The specific configuration may indicate a transmission route for the transmission of the data from the on-premise device to the selected cloud storage platform. Based on the configuration of the plurality of channels 108, the data may be transmitted through a specific serializer from amongst the set of serializers 110, a specific authenticator from amongst the plurality of authenticators 112, and a specific transport from amongst the plurality of transports 114, as will described with reference to FIG. 2.

In an example, various components of the UDT system 100, such as the data integration framework 104, the set of serializers 110, the plurality of authenticators 112, the plurality of transports 114, and the like, may be part of a single device. In another example, each component of the UDT system 100 may be part of a single stand-alone device. In yet another example, two or more components of the UDT system 100 may be part of a single stand-alone device and rest of the components of the UDT system 100 may be part of another stand-alone device or a plurality of stand-alone devices. The UDT system 100 may include a network (not shown in FIG. 1), through which various components of the UDT system 100, such as the data integration framework 104, the set of serializers 110, the plurality of authenticators 112, the plurality of transports 114, and the like, may be communicating with each other within the organization and also outside the organization, to the plurality of cloud storage platforms 102. The network may, for example, include wireless networks, wireless Local Area Network (WLAN), RAN, satellite-based network, and the like.

Figure 2:
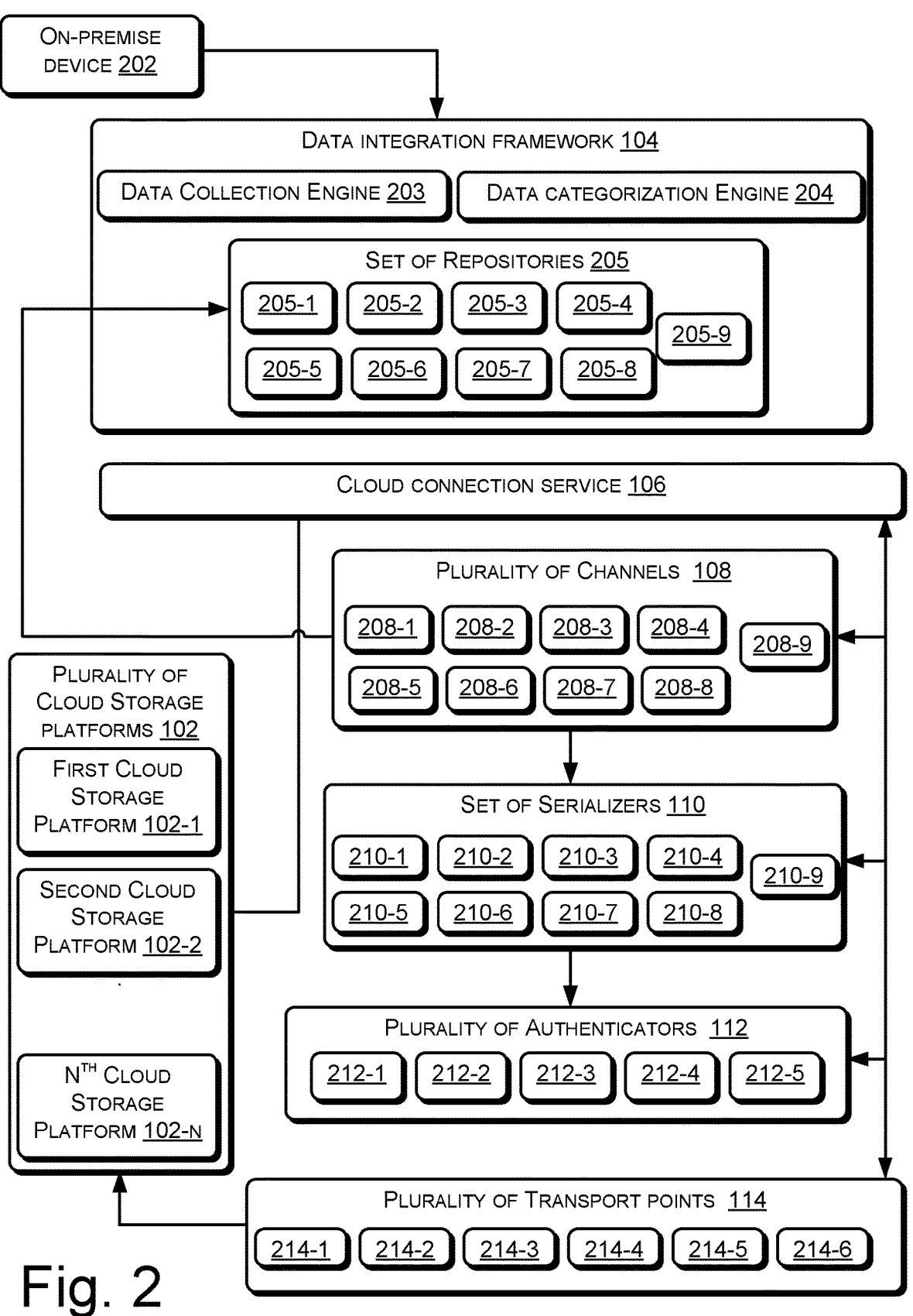
FIG. 2 illustrates a block diagram of an UDT system, according to an example implementation of the present subject matter.

FIG. 2 illustrates a block diagram of the UDT system 100, according to an example implementation of the present subject matter. The UDT system 100 may transmit the data from the on-premise device 202 to the plurality of cloud storage platforms 102. The on-premise device 202 may be, for example, an Internet-of-Things (IoT)-based sensor, an IoT-based electrical appliance, an IoT-based camera, and a biometric attendance system to track the presence of an employee of the organization, and the like. Although, in the example depicted herein, only a single on-premise device 202 is illustrated, there may be a plurality of on-premise devices 202 whose data are to be transmitted to the plurality of cloud storage platforms 102.

The data integration framework 104 may be part of a computing device that has processing capabilities, such as a server, a desktop, a laptop, a tablet, a mobile phone, or the like. For instance, the data integration framework 104 may be part of the device that include, for example, a microprocessor, a microcomputer, a microcontroller, a digital signal processor, a central processing unit, a state machine, a logic circuitry, or a device that manipulates signals based on operational instructions. Among other capabilities, the processing unit may fetch and execute computer-readable instructions stored in a memory (not shown in FIG. 2), such as a volatile memory or a non-volatile memory, of the device. In an example, the device with which the data integration framework 104 is part of may be disposed with in the location of the organization.

In an example, the data integration framework can be Niagara platform. The data integration framework 104 may include a data collection engine 203 and a data categorization engine 204. Further, as mentioned earlier, the data integration framework 104 may include the set of repositories 205. The data collection engine 203 may collect the data from the on-premise device 202. The data categorization engine 204 may categorize the collected data into one or more categories to store each category of data in a repository of the set of repositories 205. Particularly, the data categorization engine 204 may normalize the data from the on-premise device 202 to categorize into one or more categories.

In an example, the set of repositories 205 may be, for example, a point repository 205-1, a history repository 205-2, an alarm repository 205-3, a model repository 205-4, an event repository 205-5, a heartbeat repository 205-6, a messaging repository 205-7, a back-up repository 205-8, or a command repository 205-9. The point repository 205-1 may store live data of the on-premise device 202. The history repository 205-2 may store an historical collection of the live data of the on-premise device 202. In an example, the history repository 205-2 may store historical values from an on-premise device 202. For instance, the historical values can be collected on an interval or on a change of value corresponding to the on-premise device. The history repository 205-2 may include historical values from a software point (a point not connected to any physical input or output). In another example, a history log that was originally collected on another device and then was imported into the data integration framework 104. The history repository 205-2 may include an audit log of actions that were taken by users logged in to the on-premise device 202. The history repository 205-2 may also include a log history of messages logged by components of the data integration framework 104, according to the configured logging levels for each logger class. The history repository 205-2 may include a security log of security related events that have occurred at a given instance of data integration framework 104 running in a virtual machine at a particular site. The history repository 205-2 may include a log multiple, where several values are collected atomically at the same time with a single timestamp.

The alarm repository 205-3 may store an abnormal event associated with the on-premise device 202. The model repository 205-4 may store data that is to represent a semantic model of the plurality of cloud storage platforms 102. The event repository 205-5 may store data corresponding to events other than abnormal event associated with the on-premise device 202. The heartbeat repository 205-6 may store data corresponding to health information of the on-premise device 202. The messaging repository 205-7 may store data corresponding to an arbitrary message from the on-premise device 202. The back-up repository 205-8 may store back-up data corresponding to the on-premise device 202. In an example, the set of repositories 205 may include a command repository 205-9 that may store commands from the plurality of cloud storage platforms 102 to the on-premise device 202. In an example, the set of repositories 205 may include any other type of repositories.

Each of the set of serializers 110 may be part of a computing device that has processing capabilities, such as a server, a desktop, a laptop, a tablet, a mobile phone, or the like. For instance, the set of serializers may be part of the device that include, for example, a microprocessor, a microcomputer, a microcontroller, a digital signal processor, a central processing unit, a state machine, a logic circuitry, or a device that manipulates signals based on operational instructions. Among other capabilities, the processing unit may fetch and execute computer-readable instructions stored in a memory (not shown in FIG. 2), such as a volatile memory or a non-volatile memory, of the warehouse management system. In an example, the device with which the set of serializers 110 are part of may be disposed with in the location of the organization. In an example, the set of serializers 110 may include a point message serializer 210-1, a history update serializer 210-2, an alarm message serializer 210-3, a model message serializer 210-4, an event serializer 210-5, a heartbeat serializer 210-6, a messaging serializer 210-7, a back-up serializer 210-8, or a command message serializer 210-9. In an example, the transmittable formats by the set of serializers may include an Extensible Markup Language (XML) format, JavaScript Object Notation (JSON) format, Binary Javascript Object Notation (BSON) format, Yet Another markup Language (YAML) formal, MessagePack format, protobuf format, or a combination thereof. In an example, the transmittable format may include any other type of transmittable formats.

The plurality of authenticators 112 may be part of a computing device that has processing capabilities, such as a server, a desktop, a laptop, a tablet, a mobile phone, or the like. For instance, the plurality of authenticators may be part of the device that include, for example, a microprocessor, a microcomputer, a microcontroller, a digital signal processor, a central processing unit, a state machine, a logic circuitry, or a device that manipulates signals based on operational instructions. Among other capabilities, the processing unit may fetch and execute computer-readable instructions stored in a memory (not shown in FIG. 2), such as a volatile memory or a non-volatile memory, of the warehouse management system. In an example, the device with which the plurality of authenticators 112 is part of may be disposed with in the location of the organization.

The plurality of authenticators 112 may, for example, include a certificate-based authenticator 212-1, a Raw Public Key (RPK)-based authenticator 212-2, a password-based authenticator 212-3, a token authenticator 212-4, a federated identity authenticator 212-5, or a combination thereof. The certificate-based authenticator 212-1 may secure the converted data using digital certificates, such as a Public Key Infrastructure (PKI) certificate. The RPK-based authenticator 212-2 may secure the converted data using a public key. The password-based authenticator 212-3 may secure the converted data using a password. The token authenticator 212-4 may secure the converted data using an access token. The federated identity authenticator 212-5 may secure the converted data using a federated identity management architecture, where two or more applications can be accessed using a single set of credentials. In an example, the plurality of authenticators 204 may include any other type of authenticator.

The plurality of transports 114 may be part of a computing device that has processing capabilities, such as a server, a desktop, a laptop, a tablet, a mobile phone, or the like. For instance, the plurality of transports may be part of the device that include, for example, a microprocessor, a microcomputer, a microcontroller, a digital signal processor, a central processing unit, a state machine, a logic circuitry, or a device that manipulates signals based on operational instructions. Among other capabilities, the processing unit may fetch and execute computer-readable instructions stored in a memory (not shown in FIG. 2), such as a volatile memory or a non-volatile memory, of the warehouse management system. In an example, the device with which the plurality of transports 114 is part of may be disposed with in the location of the organization.

The transport 214-1 may transmit the protected data in a Message Queuing Telemetry Transport (MQTT) protocol. The transport 214-2 may transmit the protected data in a Hyper Text Transfer Protocol (HTTP). The transport 214-3 may transmit the protected data in an Advanced Message Queuing Protocol (AMQP). The transport 214-4 may transmit the protected data in a Data Distributed Service (DDS) protocol. The transport 214-5 may transmit the protected data in an Extensible Messaging and Presence Protocol (XMPP). The transport 214-6 may transmit the protected data in a Constrained Application Protocol (CoAP). In an example, the plurality of transports 114 may include any other type of transports.

The cloud connection service 106 may configure the plurality of channels 108. The plurality of channels 108 may include a point channel 208-1, a history channel 208-2, an alarm channel 208-3, a model channel 208-4, an event channel 208-5, a heartbeat channel 208-6, a messaging channel 208-7, a back-up channel 208-8, or a command channel 208-9. The point channel 208-1 may enable delivery of live data of the on-premise device 202, the history channel 208-2 to enable delivery of an historical collection of the live data of the on-premise device 202, and the alarm channel 208-3 may enable delivery of data corresponding to an abnormal event associated with the on-premise device 202. The model channel 208-4 may represent the semantic model to the plurality of cloud storage platforms 102. The event channel 208-5 may enable delivery of data corresponding to events other than abnormal event associated with the on-premise device 202. The heartbeat channel 208-6 may enable delivery of data corresponding to health information of the on-premise device 202. The messaging channel 208-7 may enable delivery of arbitrary message and the back-up channel may enable delivery of back-up of data corresponding to the on-premise device 202. The command channel 208-9 may receive and process commands from the plurality of cloud storage platforms to the on-premise device 202. In an example, the plurality of channels 108 may include a schedule channel (not shown in FIG. 2) for synchronizing schedule and calendar configurations from the on-premise device 202 up to the plurality of cloud storage platforms 102 for visualization and configuration. In other examples, the plurality of channels 108 may include any other type of channel.

Each of the plurality of channels 108 may be connected to a corresponding repository from the set of repositories 205. For instance, the points channel 208-1 may be connected to the points repository 205-1, the history channel 208-2 may be connected to the history repository 205-2, and the like. Further, each of the plurality of channels 108 may transmit the data to the corresponding serializer. For instance, the history channel 208-2 may transmit the data to the history serializer 210-2, the points channel 208-1 may transmit the data to the point message serializer 210-1, and the like.

To enable the transmission of the data to the plurality of cloud storage platforms 102, the cloud connection service 106 may be semantically linked with the selected cloud storage platform. For instance, if the data is to be transmitted to the first cloud storage platform 102-1, the cloud connection service 106 may semantically linked with the first cloud storage platform 102-1. In other words, an associated messaging protocol of the first cloud storage platform 102-1 may be linked with an associated messaging protocol of the cloud connection service 106. If the data is to be transmitted to the second cloud storage platform 102-2, the cloud connection service 106 may semantically linked with the second cloud storage platform 102-2. In other words, an associated messaging protocol of the second cloud storage platform 102-2 may be linked with the associated messaging protocol of the cloud connection service 106.

During the operation, the cloud connection service 106 may receive a selection of a cloud storage platform from the plurality of cloud storage platforms 102 for the cloud connection service 106 to load the collected data. For instance, assume that a user is to store points data corresponding to the on-premise device 202 in the first cloud storage platform 102-1. In this regard, the cloud connection service 106 may receive the selection of the first cloud storage platform 102-1 from the user.

Upon receiving the selection of the first cloud storage platform 102-1, the cloud connection service 106 may configure the plurality of channels 108 to the specific configuration based on the category of the data and the selected cloud storage platform 102. The specific configuration will be referred to as "first specific configuration". The first specific configuration of the plurality of channels 108 may indicate a first transmission route for the transmission of the collected data from the on-premise device 202 to the selected first cloud storage platform 102-1. The first transmission route may be a route including the components, such as a first specific serializer, a first specific authenticator, and a first specific transport, through which the data is to be transmitted to the selected first cloud storage platform 102-1.

Further, the cloud connection service 106 may select the first specific serializer from amongst the set of serializers 110, the first specific authenticator from amongst the plurality of authenticators 112, and the first specific transport from amongst the plurality of transports 114 based on the category of the data and the selected first cloud storage platform 102-1. Assume that the first cloud storage platform 102-1 may require XML serialization, a token authentication, and transportation using the MQTT transport protocol. Accordingly, the cloud connection service 106 may select the point message serializer 210-1 to convert the data received from the point channel 208-1 in the XML format. In other words, the first specific serializer may be the point message serializer 210-1. Further, the cloud connection service 106 may select the authenticator 212-4 for securing the converted data with an access token. In other words, the first specific authenticator may be the token authenticator 212-4. Further, the cloud connection service may select the transport 214-1 to transport the secured data in MQTT protocol. In other words, the first specific transport may be the transport 214-1.

In this regard, the first specific serializer, the first specific authenticator, and the first specific transport may be pluggable to form the first transmission route connecting the on-premise device 202 to the selected first cloud storage platform 102-1. Pluggable indicates any serializer from the set of serializers 110, any authenticator from the set of authenticators 112, and any transport from the set of transports 114 may form the transmission route depending on the category of the data and the cloud storage platform 102 to which the data is to be transmitted in a composable manner.

In the example explained above, the point message serializer, the authenticator 212-4, and the transport 214-1 are selected. However, for example, subsequent to the transmission of the above data, another type of data is to be transmitted to another cloud storage platform. Accordingly, the following operations may be performed:

The cloud connection service 106 may receive a selection of a cloud storage platform from the plurality of cloud storage platforms 102 for the cloud connection service 106 to load the collected data. For instance, assume that a user is to store history data corresponding to the on-premise device 202 in the second cloud storage platform 102-2. In this regard, the cloud connection service 106 may receive the selection of the second cloud storage platform 102-2 from the user.

Upon receiving the selection of the second cloud storage platform 102-2, the cloud connection service 106 may re-configure the plurality of channels 108 to a second specific configuration based on the category of the data and the selected second cloud storage platform 102-2. The specific second configuration of the plurality of channels 108 may indicate a second transmission route for the transmission of the collected data from the on-premise device 202 to the selected second cloud storage platform 102-2. The second transmission route may be a route including the components, such as a second specific serializer, a second specific authenticator, and a second specific transport, through which the data is to be transmitted to the selected second cloud storage platform 102-2.

Further, the cloud connection service 106 may select the second specific serializer from amongst the set of serializers 110, the second specific authenticator from amongst the plurality of authenticators 112, and the second specific transport from amongst the plurality of transports 114 based on the category of the data and the selected second cloud storage platform 102-2. Assume that the second cloud storage platform 102-2 may require JSON serialization, an RPK-based authentication, and transportation using the MQTT transport protocol. Accordingly, the cloud connection service 106 may select the history update serializer 210-2 to convert the data received from the point channel 208-1 in the JSON format. Further, the cloud connection service 106 may select the authenticator 212-2 for securing the converted data with the RPK-based authentication. Further, the cloud connection service 106 may select the transport 214-1 to transport the secured data in MQTT protocol. In other words, the second specific serializer is the history update serializer 210-2, the second specific authenticator is the RPK-based authenticator 212-2, and the second specific transport is the transport 214-1.

Figure 3:
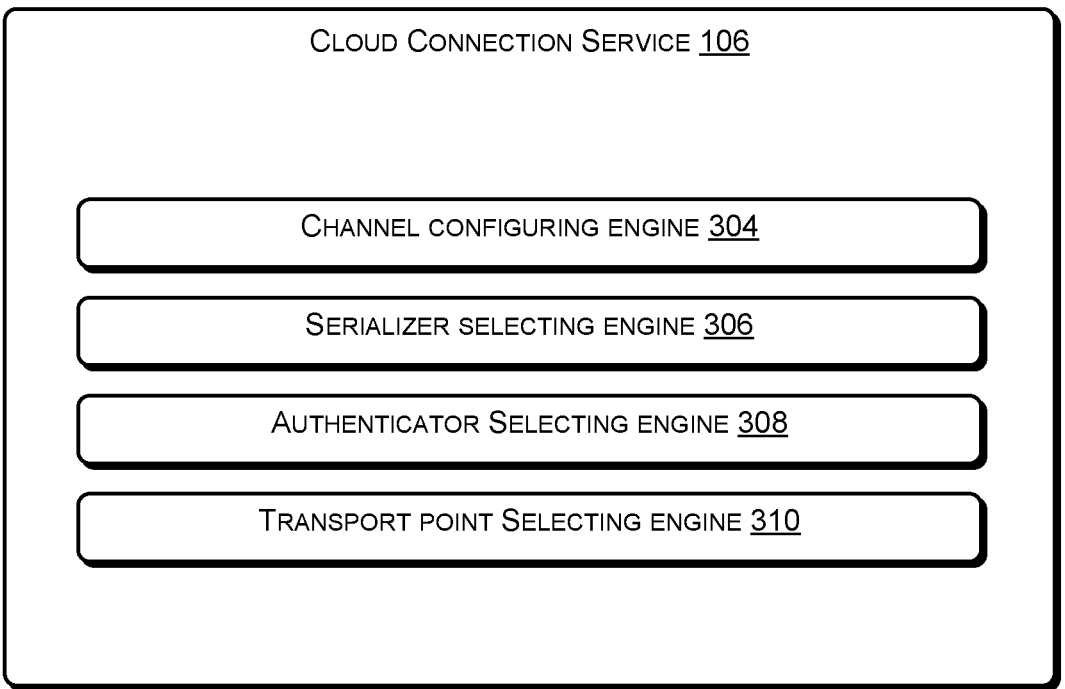
FIG. 3 illustrates a block diagram of a cloud connection service of an UDT system, according to an example implementation of the present subject matter.

FIG. 3 illustrates a block diagram of the cloud connection service 106 of the UDT system 100, according to an example implementation of the present subject matter. The cloud connection service 106 may be part of a computing device that has processing capabilities, such as a server, a desktop, a laptop, a tablet, a mobile phone, or the like. For instance, the device may include, for example, a microprocessor, a microcomputer, a microcontroller, a digital signal processor, a central processing unit, a state machine, a logic circuitry, or a device that manipulates signals based on operational instructions. Among other capabilities, the processing unit (not shown in FIG. 3) may fetch and execute computer-readable instructions stored in a memory (not shown in FIG. 3), such as a volatile memory or a non-volatile memory, of the device. In an example, the device with which the cloud connection service 106 is part of may be disposed with in the location of the organization.

The device can include a processing unit to run at least one operating system and other applications and services. The device can also include an interface (not shown in FIG. 3) and a memory (not shown in FIG. 3).

The processing unit, amongst other capabilities, may be configured to fetch and execute computer-readable instructions stored in the memory. The processing unit may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processing unit", may be provided through the use of dedicated hardware as well as hardware capable of executing machine readable instructions.

When provided by the processing unit, the functions may be provided by a single dedicated processor, by a single shared processor, or by a plurality of individual processors, some of which may be shared. Moreover, explicit use of the term "processing unit" should not be construed to refer exclusively to hardware capable of executing machine readable instructions, and may implicitly include, without limitation, digital signal processor (DSP) hardware, network processor, application specific integrated circuit (ASIC), field programmable gate array (FPGA), read only memory (ROM) for storing machine readable instructions, random access memory (RAM), non-volatile storage. Other hardware, conventional and/or custom, may also be included.

The interface may include a variety of machine-readable instructions-based interfaces and hardware interfaces that allow the cloud communication device to interact with different entities, such as the processing unit, and the data (not shown in FIG. 3). Further, the interface may enable the components of the cloud connection service 106 to communicate with computing devices, web servers, and external repositories. The interface may facilitate multiple communications within a wide variety of networks and protocol types, including wireless networks, wireless Local Area Network (WLAN), RAN, satellite-based network, and the like.

The memory may be coupled to the processing unit and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the cloud connection service 106 can include one or more engines 304-310. The engines 304-310 may include routines, programs, objects, components, data structures, and the like, which perform particular tasks or implement particular abstract data types. Further, the engines 304-310 may be implemented in hardware, instructions executed by a processing unit, or by a combination thereof.

In an implementation, the engines 304-310 may be machine-readable instructions which, when executed by the processing unit, perform any of the described functionalities. The machine-readable instructions may be stored on an electronic memory device, hard disk, optical disk or other machine-readable storage medium or non-transitory medium. In one implementation, the machine-readable instructions can also be downloaded to the storage medium via a network connection.

The engines 304-310 may perform different functionalities. The engines 304-310 may include a channel configuring engine 304, a serializer selecting engine 306, an authenticator selecting engine 308, and a transport selecting engine 310.

The channel configuring engine 304 may enable configuration of the plurality of channels 108 (not shown in FIG. 3) to the first specific configuration and re-configuration of the plurality of channels 108 to the second specific configuration, as described with reference to FIG. 2. The serializer selecting engine 306 may select the first specific serializer and the second specific serializer, as described with reference to FIG. 2. Particularly, the serializer selecting engine 306 may select a serializer from amongst the set of serializers 110 corresponding to the data which is to be transmitted. For instance, if the history data is to be sent in a JSON format, the serializer selecting engine 406 may select the history update serializer 210-2 (not shown in FIG. 3), if the points data is to be sent, the serializer selecting engine 406 may select the point message serializer 210-1, and so on.

The authenticator selecting engine 308 may select the first specific authenticator and the second specific authenticator, as described with reference to FIG. 2. The authenticator selecting engine 308 may select an authenticator based on the category of the data and the selected cloud storage platform 102 (not shown in FIG. 3). The transports selecting engine 310 may select the first specific transport and the second specific transport based on the category of the data and the selected cloud storage platform 102.

Figure 4:
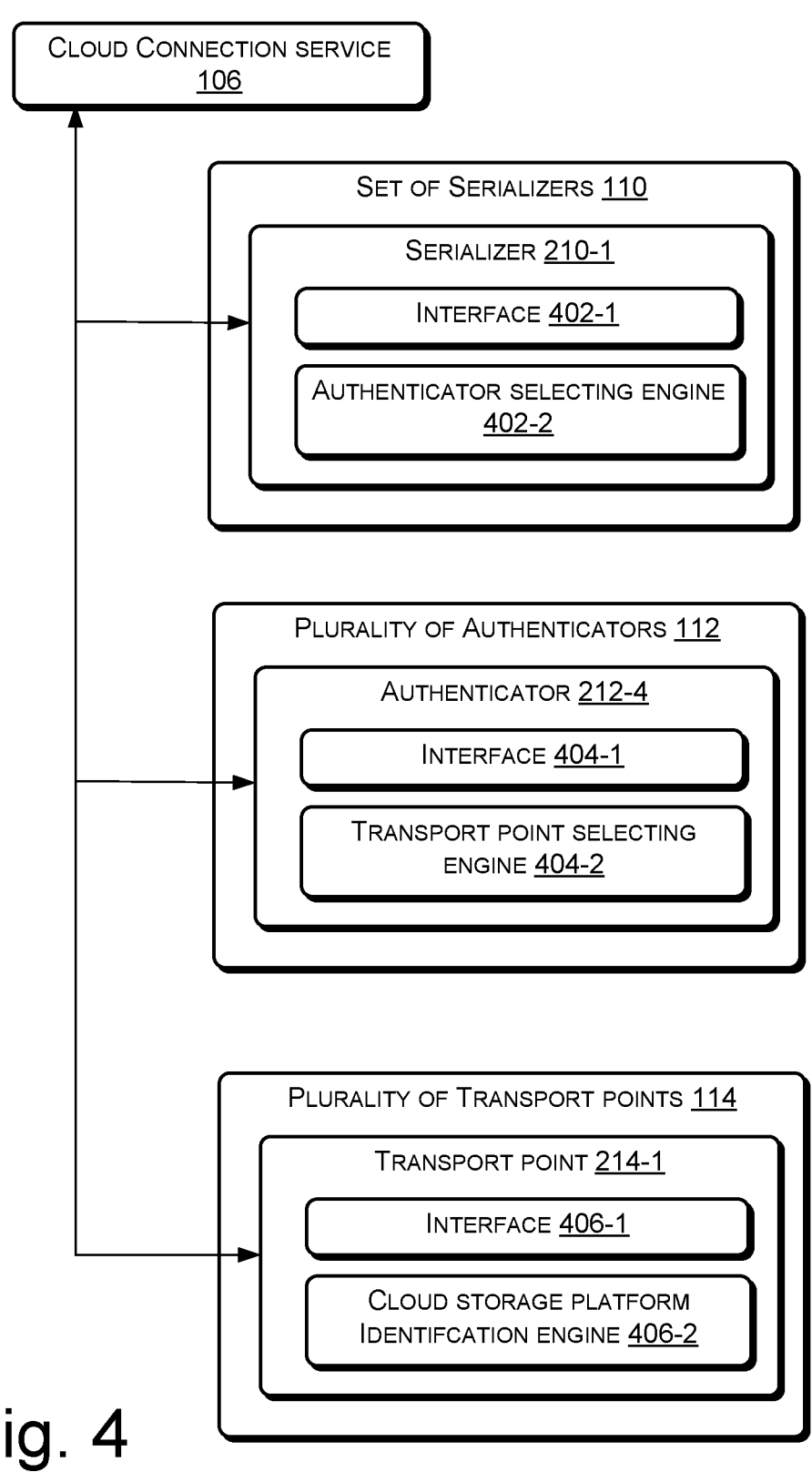
FIG. 4 illustrates a cloud connection service, a set of serializers, a plurality of authenticators, and a plurality of transports of an UDT system, according to an example implementation of the present subject matter.

FIG. 4 illustrates the cloud connection service 106, the set of serializers 110, the plurality of authenticators 112, and the plurality of transports 114 of the UDT system 100, according to an example implementation of the present subject matter. In an example, assume that points data is to be transmitted to the first cloud storage platform 102-1 (not shown in FIG. 4). Further, assume that the transmission may require XML serialization, a token authentication, and transportation using the MQTT transport protocol. Accordingly, in the example depicted herein, the first specific serializer is explained with reference to the point message serializer 210-1, the first specific authenticator is explained with reference to the token authenticator 212-4, and the first transport is explained with reference to the transport 214-1.

In this regard, the cloud connection service 106 may select the first specific serializer corresponding to the data that is to be transmitted and the first transmittable format, as explained with reference to FIG. 2.

The point message serializer 210-1 can be a part of the device (not shown in FIG. 4) that can include a processing unit to run at least one operating system and other applications and services. The device can also include a memory. The processing unit, amongst other capabilities, may be configured to fetch and execute computer-readable instructions stored in the memory. The processing unit may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processing unit", may be provided through the use of dedicated hardware as well as hardware capable of executing machine readable instructions.

When provided by the processing unit, the functions may be provided by a single dedicated processor, by a single shared processor, or by a plurality of individual processors, some of which may be shared. Moreover, explicit use of the term "processing unit" should not be construed to refer exclusively to hardware capable of executing machine readable instructions, and may implicitly include, without limitation, digital signal processor (DSP) hardware, network processor, application specific integrated circuit (ASIC), field programmable gate array (FPGA), read only memory (ROM) for storing machine readable instructions, random access memory (RAM), non-volatile storage. Other hardware, conventional and/or custom, may also be included.

The memory may be coupled to the processing unit and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the point message serializer 210-1 can include an authenticator selecting engine 402-2 and an interface 402-1.

The authenticator selecting engine 402-2 and the interface 402-1 may include routines, programs, objects, components, data structures, and the like, which perform particular tasks or implement particular abstract data types. Further, the authenticator selecting engine 402-2 and the interface 402-1 may be implemented in hardware, instructions executed by a processing unit, or by a combination thereof.

During the operation, the interface 402-1 may determine the first specific configuration of the plurality of channels 108 using the cloud connection service 106. The interface 402-1 may be, for example, Java-based interface. The interface 402-1 may be, for example, any other type of interface. Further, the authenticator selecting engine 402-2 may select the first specific authenticator based on the first specific configuration of the plurality of channels 108.

The token authenticator 212-4 can be a part of the device (not shown in FIG. 4) that can include a processing unit to run at least one operating system and other applications and services. The device can also include a memory. The processing unit, amongst other capabilities, may be configured to fetch and execute computer-readable instructions stored in the memory. The processing unit may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processing unit", may be provided through the use of dedicated hardware as well as hardware capable of executing machine readable instructions.

When provided by the processing unit, the functions may be provided by a single dedicated processor, by a single shared processor, or by a plurality of individual processors, some of which may be shared. Moreover, explicit use of the term "processing unit" should not be construed to refer exclusively to hardware capable of executing machine readable instructions, and may implicitly include, without limitation, digital signal processor (DSP) hardware, network processor, application specific integrated circuit (ASIC), field programmable gate array (FPGA), read only memory (ROM) for storing machine readable instructions, random access memory (RAM), non-volatile storage. Other hardware, conventional and/or custom, may also be included.

The memory may be coupled to the processing unit and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the token authenticator 212-4 can include a transport selecting engine 404-2 and an interface 404-1. The transport selecting engine 404-2 and the interface 404-1 may include routines, programs, objects, components, data structures, and the like, which perform particular tasks or implement particular abstract data types. Further, the transport selecting engine 404-2 and the interface 404-1 may be implemented in hardware, instructions executed by a processing unit, or by a combination thereof.

During the operation, the interface 404-1 may determine the first specific configuration of the plurality of channels 108 using the cloud connection service 106. The interface 404-1 may be, for example, Java-based interface. In an example, the interface 404-1 may be any other type of interface. Further, the transport selecting engine 404-2 may select the first specific transport based on the first specific configuration of the plurality of channels 108.

The transport 214-1 can be a part of the device (not shown in FIG. 4) that can include a processing unit to run at least one operating system and other applications and services. The device can also include a memory. The processing unit, amongst other capabilities, may be configured to fetch and execute computer-readable instructions stored in the memory. The processing unit may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processing unit", may be provided through the use of dedicated hardware as well as hardware capable of executing machine readable instructions.

When provided by the processing unit, the functions may be provided by a single dedicated processor, by a single shared processor, or by a plurality of individual processors, some of which may be shared. Moreover, explicit use of the term "processing unit" should not be construed to refer exclusively to hardware capable of executing machine readable instructions, and may implicitly include, without limitation, digital signal processor (DSP) hardware, network processor, application specific integrated circuit (ASIC), field programmable gate array (FPGA), read only memory (ROM) for storing machine readable instructions, random access memory (RAM), non-volatile storage. Other hardware, conventional and/or custom, may also be included.

The memory may be coupled to the processing unit and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the transport 214-1 can include a cloud storage platform identification engine 406-2 and an interface 406-1. The cloud storage platform identification engine 406-2 and the interface 406-1 may include routines, programs, objects, components, data structures, and the like, which perform particular tasks or implement particular abstract data types. Further, the cloud storage platform identification engine 406-2 and the interface 406-1 may be implemented in hardware, instructions executed by a processing unit, or by a combination thereof.

During the operation, the interface 406-1 may determine the first specific configuration of the plurality of channels 108 using the cloud connection service 106. The interface 406-1 may be, for example, java-based interface. In an example, the interface 406-1 may be any other type of interface. Further, the cloud storage platform identification engine 406-2 may select the first cloud storage platform based on the first specific configuration of the plurality of channels 108.

In the above examples, the first specific serializer is explained with reference to the point message serializer 210-1, the first specific authenticator is explained with reference to the token authenticator 212-4, and the first transport is explained with reference to the transport 214-1. However, the other set of serializers 110, such as history update serializer 210-2, alarm message serializer 210-3, and the like, may include same components as explained above. Similarly, the other plurality of authenticators 112, such as the password-based authenticator 212-3, the certificate-based authenticator 212-1, and the like, may include the same components. The other plurality of transports 114, such as the transports, 214-2-214-5, may include the same components as explained above.

Figure 5:
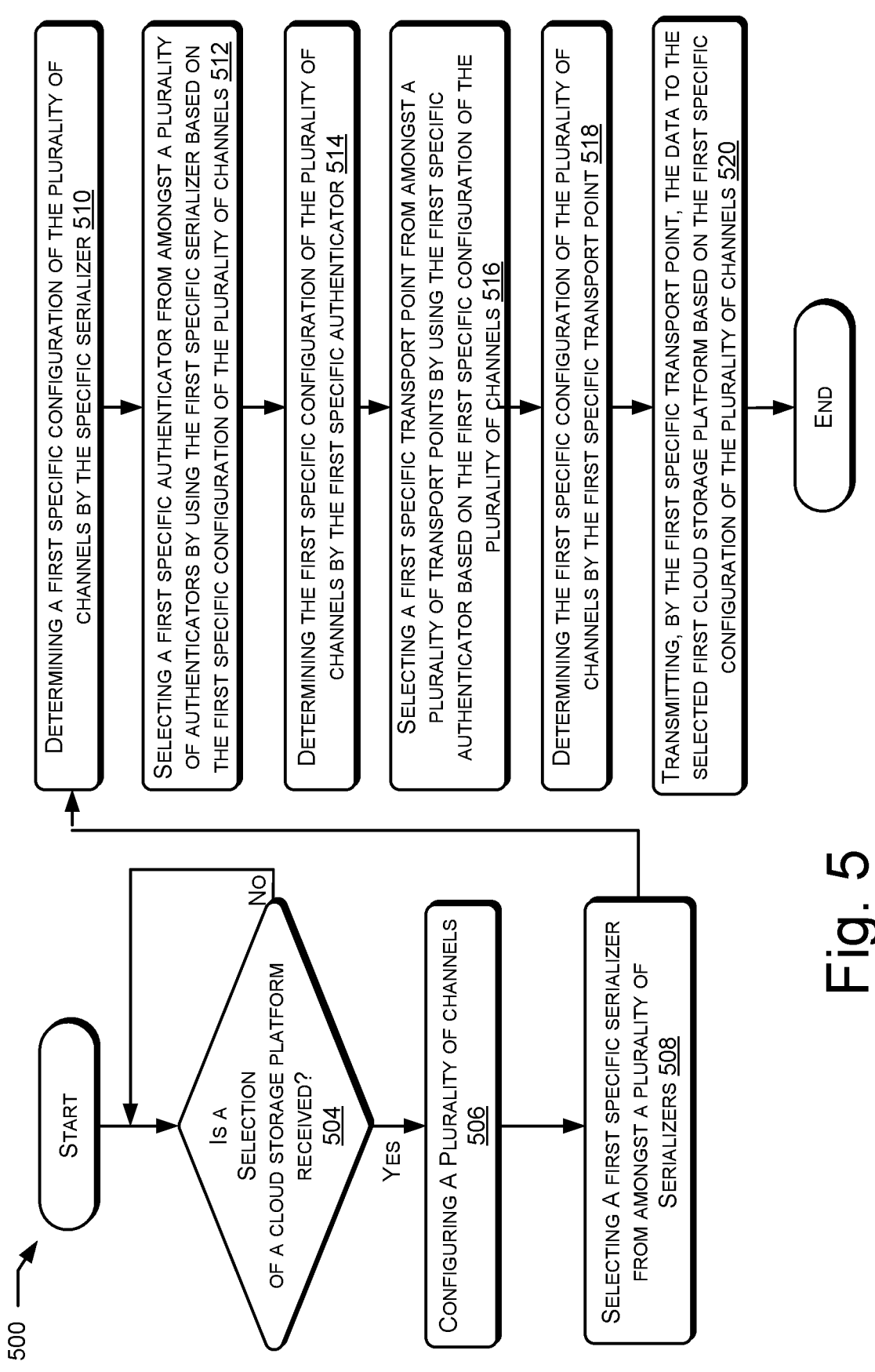
FIG. 5 illustrates a method for transmitting data to a cloud storage platform, according to an example implementation of the present subject matter.

FIG. 5 illustrates a method 500 for transmitting data to a cloud storage platform, according to an example implementation of the present subject matter. The order in which the method 500 is described is not intended to be construed as a limitation, and any number of the described method blocks may be combined in any order to implement the method 500, or an alternative method. Furthermore, the method 600 may be implemented by processor(s) or computing device(s) through any suitable hardware, non-transitory machine-readable instructions, or a combination thereof.

It may be understood that steps of the method 500 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 500 may be performed by the UDT system 100.

At step 504, a cloud connection service may receive a selection of a cloud storage platform from amongst a plurality of cloud storage platforms. Assume that a first cloud storage platform is selected by a user. The cloud connection service may receive the selection of cloud connection service. At step 504, if the cloud connection service does not receive a selection of a cloud storage platform, the cloud connection service may perform step 502, till the selection is received by the cloud connection service. The cloud connection service may correspond to the cloud connection service 106, and the plurality of cloud storage platforms may correspond to the plurality of cloud storage platforms 102.

At step 506, the cloud connection service may configure a plurality of channels. The configuration of the plurality of channels may be a first specific configuration, as explained with reference to FIG. 2. The first specific configuration may indicate a transmission route for the transmission of the data to the selected cloud storage platform. The plurality of channels may correspond to the plurality of channels 108.

At step 508, the cloud connection service may select a first specific serializer from amongst a set of serializers. The set of serializers may correspond to the set of serializers 110. Assume that the transmission of the alarm data corresponding to the on-premise device to the first cloud storage platform requires YAML format serialization, a password authentication, and transportation using AMQP protocol. In this regard, since the alarm data has to be transmitted, the cloud connection service may select the alarm message serializer. The alarm message serializer may convert the alarm data into the YAML format. The alarm message serializer may correspond to the alarm message serializer 210-3.

At step 510, the first specific serializer may determine the first specific configuration of the plurality of channels using the cloud connection service. For instance, the alarm message serializer may communicate with the cloud connection service and may determine the first specific configuration of the plurality of channels. At step 512, the first specific serializer may select a first specific authenticator from amongst a plurality of authenticators based on the first specific configuration of the channels. The plurality of authenticators may correspond to the plurality of authenticators. For example, the alarm message serializer may select the password-based authenticator. The password-based authenticator may secure to generate a first protected data. In other words, the password-based authenticator may secure the converted alarm data with a password. The password-based authenticator may correspond to the password-based authenticator 212-3.

At step 514, the first specific authenticator may determine the first specific configuration of the plurality of channels using the cloud connection service. For instance, the password-based authenticator may communicate with the cloud connection service and may determine the first specific configuration of the plurality of channels. At step 516, the first specific authenticator may select a first specific transport from amongst a plurality of transports. The plurality of transports may correspond to the plurality of transports 114. For example, the password-based authenticator may select the transport, such as the transport 214-3.

At step 518, the first specific transport may determine the first specific configuration of the plurality of channels using the cloud connection service. For instance, the transport may communicate with the cloud connection service and may determine the first specific configuration of the plurality of channels. At step 520, the first specific transport may transmit the first protected data to the selected cloud storage platform based on the first specific configuration of the plurality of channels. For instance, the first specific transport may transmit the data authenticated with the password to the first cloud storage platform in the AMQP protocol.

Figure 6B:
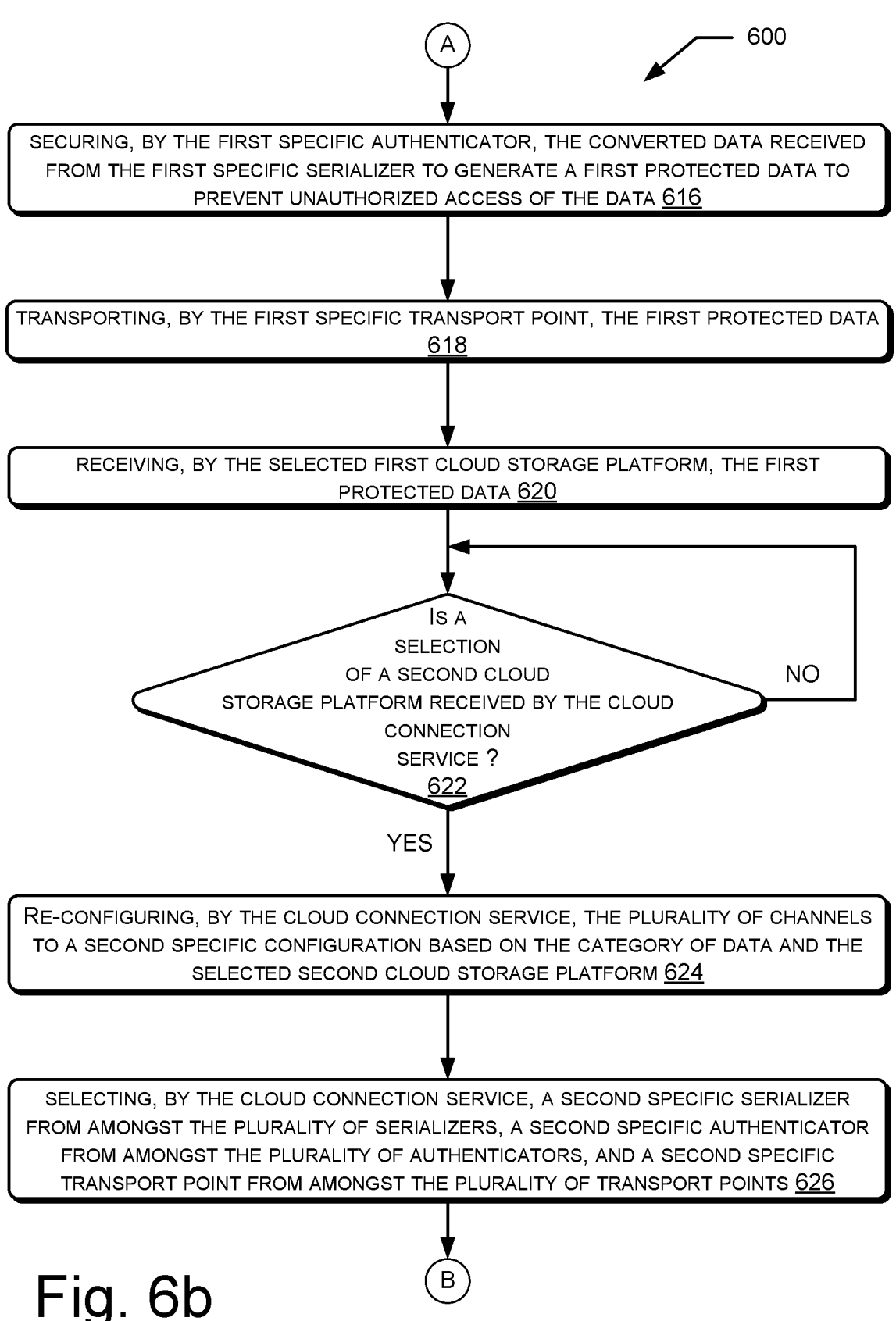
Figure 6C:
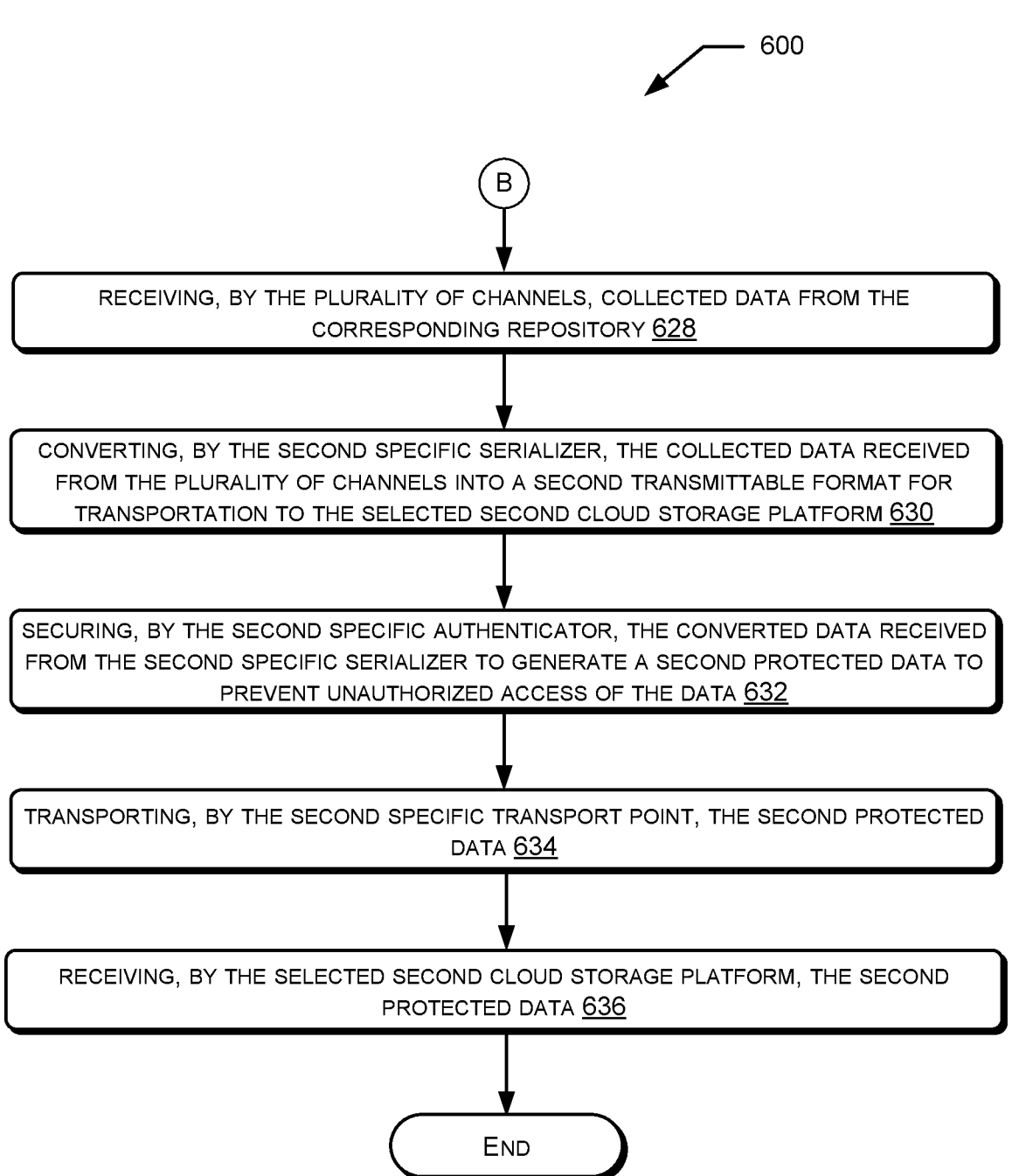

FIGS. 6a-6c illustrate a method 600 for universal transmission of data to a plurality of cloud storage platforms, according to an example implementation of the present subject matter. The order in which the method 600 is described is not intended to be construed as a limitation, and any number of the described method blocks may be combined in any order to implement the method 600, or an alternative method. Furthermore, the method 600 may be implemented by processor(s) or computing device(s) through any suitable hardware, non-transitory machine-readable instructions, or a combination thereof.

It may be understood that steps of the method 600 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 600 may be performed by the UDT system 100.

At step 602, data may be transmitted by an on-premise device to a data integration framework. The data integration framework may include a set of repositories. Each repository in the set of repositories may store a category of data. The on-premise device may correspond to the on-premise device 202 and the data integration framework may correspond to the data integration framework 104. At step 602, if the data is not transmitted to the data integration framework, the method 600 may await till the data is received.

At step 604, the data collected from the on-premise device may be stored by the data integration framework based on the category of the collected data into one or more repositories in the set of repositories.

At step 606, a selection of a first cloud storage platform from a plurality of cloud storage platforms may be received by a cloud connection service for the cloud connection service to load the collected data. The cloud connection service is operationally coupled to the data integration framework and the plurality of cloud storage platforms. The plurality of cloud storage platforms may be, for example, 102. The first cloud storage platform may correspond to the cloud storage platform 102-1. The cloud connection service may correspond to the cloud connection service 106. At step 606, if the selection of the first cloud storage platform is not received, the method may await till the selection is received at step 606.

At step 608, a plurality of channels may be configured by the cloud connection service to a first specific configuration based on the category of the data and the selected first cloud storage platform. The first specific configuration may indicate a first transmission route for transportation of the collected data from the on-premise device to the selected first cloud storage platform. The plurality of channels may correspond to the plurality of channels 108.

Assume that the first cloud storage platform, such as the first cloud storage platform 102-1 is the cloud storage platform to which the data is to be transmitted to from the on-premise device. Further, assume that the points data are to be transmitted to the first cloud storage platform. Yet further, assume that the for the transmission of the points data to the first cloud storage platform requires serialization in BSON format, an RPK-based authenticator, and transportation in DDS protocol. In this regard, based on the points data and the selected first cloud storage platform, the cloud connection service may configure the plurality of channels based on the first specific configuration.

At step 610, a first specific serializer from amongst a plurality of serializers, a first specific authenticator from amongst a plurality of authenticators, and a first specific transport from amongst a plurality of transports may be selected by the cloud connection service. The first specific serializer, the first specific authenticator, and the first specific transport may be pluggable to form the first transmission route connecting the on-premise device to the selected first cloud storage platform. For instance, to serialize the points data in BSON format, the cloud connection service may select the point message serializer, such as the point message serializer 210-1. To enable the RPK-based authentication, the cloud connection service may select the RPK-based authenticator, such as the RPK-based authenticator 212-2. To enable the transportation in DDS protocol, the cloud connection service may select the transport, such as the transport 214-4.

At step 612, each of the plurality of channels may be connected to a corresponding repository of set of repositories of the data integration framework to receive the data therefrom. For instance, the point channel, such as the point channel 208-1, may receive the points data from the point repository 205-1 of the data integration framework. The plurality of channels may be connected to a corresponding repository by the cloud connection service.

At step 614, converting, by the first specific serializer, the collected data received from the plurality of channels into a first transmittable format for transportation to the selected first cloud storage platform. For instance, the points message serializer may receive the points data from the point channel and may convert the points data in BSON format.

At step 616, the converted data received from the first specific serializer may be secured by the first specific authenticator to generate a first protected data. The securing of the data may prevent unauthorized access of the data. For example, the converted data in BSON format may be received by the authenticator, such as the authenticator 212-2, from the points channel. The authenticator may secure the converted data to generate the first protected data using an RPK-based authentication At step 618, the first protected data received from the first specific authenticator may be transported by the first specific transport. For instance, the first specific transport may receive the first protected data and transport using the DDS protocol. At step 620, the selected first cloud storage platform may receive the first protected data.

In some scenarios, upon transmission of the data to the cloud storage platform, same or different data from the on-premise device may have to be transmitted to a second cloud storage platform. In this regard, to transmit the data to the second cloud storage platform, the method 600 includes the below steps:

At step 622, a selection of the second cloud storage platform from the plurality of cloud storage platforms may be received by the cloud connection service for the cloud connection service to load the collected data. The second cloud storage platform may correspond to the cloud storage platform 102-2.

At step 624, the cloud connection service may re-configure the plurality of channels to a second specific configuration based on the category of data and the selected second cloud storage platform. The second specific configuration may indicate a second specific transmission route for transportation of the collected data from the on-premise device to the selected second cloud storage platform.

Assume that the second cloud storage platform is the cloud storage platform to which the data is to be transmitted to from the on-premise device. Further, assume that the history data are to be transmitted to the second cloud storage platform. Yet further, assume that the for the transmission of the history data to the second cloud storage platform requires serialization in JSON format, an RPK-based authenticator, and transportation in XMPP protocol. In this regard, based on the history data and the selected second cloud storage platform, the cloud connection service may configure the plurality of channels based on the second specific configuration.

At step 626, a second specific serializer from amongst the plurality of serializers, a second specific authenticator from amongst the plurality of authenticators, and a second specific transport from amongst the plurality of transports may be selected by the cloud connection service. The second specific serializer, the second specific authenticator, and the second specific transport may be pluggable to form the second specific transmission route connecting the on-premise device to the selected second cloud storage platform. For instance, to serialize the history data in JSON format, the cloud connection service may select the history update serializer, such as the history update serializer 210-2. To enable RPK-based authentication, the cloud connection service may select the RPK-based authenticator, such as the RPK-based authenticator 212-2. To enable the transportation in XMPP protocol, the cloud connection service may select the transport, such as the transport 214-5.

At step 628, the collected data may be received by the plurality of channels from the corresponding repository. For instance, the history channel may receive the history data from the history repository of the data integration framework.

At step 630, the collected data received from the plurality of channels may be converted by the second specific serializer into a second transmittable format for transportation to the selected second cloud storage platform. For instance, the history update serializer may receive the history data from the history channel and may convert the history data in JSON format.

At step 632, the converted data received from the second specific serializer may be secured securing by the second specific authenticator to generate a second protected data. The securing of the data may prevent unauthorized access of the data. For example, the converted data in JSON format may be received by the authenticator from the history channel. The authenticator may secure the converted data to generate the second protected data using an RPK-based authentication.

At step 634, the second protected data received from the second specific authenticator may be transported by the second specific transport. For instance, the second specific transport may receive the second protected data and transport using the XMPP protocol. At step 636, the selected second cloud storage platform may receive the second protected data.

In an example, prior to configuring the plurality of channels, the method includes linking an associated messaging protocol of the cloud connection service to a messaging protocol of the selected first cloud storage platform. Further, prior to re-configuring the plurality of channels, the method includes linking an associated messaging protocol of the cloud connection service with a messaging protocol of the selected second cloud storage platform.

In an example, the method includes determining, by the first specific serializer, the first specific configuration of the plurality of channels from the cloud connection service. The first specific authenticator may be selected by the first specific serializer based on the first specific configuration of the plurality of channels.

In an example, the method includes determining, by the second specific serializer, the second specific configuration of the plurality of channels from the cloud connection service. The second specific authenticator may be selected by the second specific serializer based on the second specific configuration of the plurality of channels.

In another example, the first transmittable format and the second transmittable format may include an Extensible Markup Language (XML) format, JavaScript Object Notation (JSON) format, Binary Javascript Object Notation (BSON) format, Yet Another markup Language (YAML) formal, MessagePack format, protobuf format, or a combination thereof.

FIGS. 7a-7b illustrates a computing environment 700, implementing a non-transitory computer-readable medium for universally transmitting data to a plurality of cloud storage platforms, according to an example implementation of the present subject matter.

In an example, the non-transitory computer-readable medium 702 may be utilized by the UDT system 703. The UDT system 703 may correspond to the UDT system 100. The UDT system 703 may be implemented in a public networking environment or a private networking environment. In an example, the computing environment 700 may include a processing resource 704 communicatively coupled to the non-transitory computer-readable medium 702 through a communication link 706.

In an example, the processing resource 704 may be implemented in a device, such as the UDT system 100. The non-transitory computer-readable medium 702 may be, for example, an internal memory device of the UDT system 100 or an external memory device. In an implementation, the communication link 706 may be a direct communication link, such as any memory read/write interface. In another implementation, the communication link 706 may be an indirect communication link, such as a network interface. In such a case, the processing resource 704 may access the non-transitory computer-readable medium 702 through a network 708. The network 708 may be a single network or a combination of multiple networks and may use a variety of different communication protocols. The processing resource 704 and the non-transitory computer-readable medium 702 may also be communicatively coupled to the UDT system 703 over the network 708.

In an example implementation, the non-transitory computer-readable medium 702 includes a set of computer-readable instructions to universally transmit data to multiple cloud storage platforms. The set of computer-readable instructions can be accessed by the processing resource 704 through the communication link 706 and subsequently executed to perform acts to provide feedback to the actuating object.

Referring to FIG. 7, in an example, the non-transitory computer-readable medium 702 includes instructions 712 to collect data from an on-premise device by a data integration framework. The on-premise device may correspond to the on-premise device 202. The data integration framework may correspond to the data integration framework 104.

The non-transitory computer-readable medium 702 includes instructions 714 to store the data by the data integration framework based on the category of the collected data, into one or more repository in the set of repositories of the data integration framework. The non-transitory computer-readable medium 702 includes instructions 716 to receive a selection of a first cloud storage platform by a cloud connection service to load the collected data. The cloud connection service may be operationally coupled to the data integration framework and to a plurality of cloud storage platforms. The plurality of cloud storage platforms may correspond to the plurality of cloud storage platforms 102. The cloud connection service may correspond to the cloud connection service 106.

The non-transitory computer-readable medium 702 includes instructions 718 to link an associated messaging protocol of the cloud connection service to a messaging protocol of the selected first cloud storage platform. The first cloud storage platform may correspond to the first cloud storage platform 102-1.

The non-transitory computer-readable medium 702 includes instructions 720 to configure a plurality of channels to a first specific configuration, by the cloud connection service based on the category of data and the selected first cloud storage platform. The configuration of the plurality of channels may be performed as explained with reference to FIG. 2. The first specific configuration may indicate a first transmission route for transportation of the collected data from the on-premise device to the selected first cloud storage platform. The plurality of channels may correspond to the plurality of channels 108.

The non-transitory computer-readable medium 702 includes instructions 722 to select, by the cloud connection service, a first specific serializer from amongst a plurality of serializers, a first specific authenticator from amongst a plurality of authenticators, and a first specific transport from amongst a plurality of transports. The selection may be performed as explained with reference to FIG. 2. The first specific serializer, the first specific authenticator, and the first specific transport may be pluggable to form the first transmission route connecting the on-premise device to the selected first cloud storage platform. The set of serializers may correspond to the set of serializers 110, the plurality of authenticators may correspond to the plurality of authenticators 112, and the plurality of transports may correspond to the plurality of transports 114.

The non-transitory computer-readable medium 702 includes instructions 726 to convert, by the first specific serializer, the collected data received from the plurality of channels into a first transmittable format for transportation to the selected first cloud storage platform. The non-transitory computer-readable medium 702 includes instructions 728 to secure, by the first specific authenticator, the converted data received from the first specific serializer to generate a first protected data to prevent unauthorized access of the data.

The non-transitory computer-readable medium 702 includes instructions 730 to transport, by the first specific transport, the first protected data. The non-transitory computer-readable medium 702 includes instructions 732 to receive, by using the first cloud storage platform, the first protected data.

The non-transitory computer-readable medium 702 includes instructions 734 to receive, by the cloud connection service, a selection of a second cloud storage platform from the plurality of cloud storage platforms for the cloud connection service to load the collected data. The second cloud storage platform may correspond to the second cloud storage platform 102-2.

The non-transitory computer-readable medium 702 includes instructions 736 to link the associated messaging protocol of the cloud connection service to a messaging protocol of the selected second cloud storage platform. The non-transitory computer-readable medium 702 includes instructions 738 to re-configure, by the cloud connection service, the plurality of channels to a second specific configuration based on the category of data and the selected second cloud storage platform. The second specific configuration may indicate a second transmission route for transportation of the collected data from the on-premise device to the selected second cloud storage platform.

The non-transitory computer-readable medium 702 includes instructions 740 to select, by the cloud connection service, a second specific serializer from amongst the plurality of serializers, a second specific authenticator from amongst the plurality of authenticators, and a second specific transport from amongst the plurality of transports. The second specific serializer, the second specific authenticator, and the second specific transport may be pluggable to form the second transmission route connecting the on-premise device to the selected second cloud storage platform.

The non-transitory computer-readable medium 702 includes instructions 742 to receive, by the plurality of channels, collected data from the corresponding repository. The non-transitory computer-readable medium 702 includes instructions 744 to convert, by the second specific serializer, the collected data received from the plurality of channels into a second transmittable format for transportation to the selected second cloud storage platform.

The non-transitory computer-readable medium 702 includes instructions 746 to secure, by the second specific authenticator, the converted data received from the second specific serializer to generate a second protected data to prevent unauthorized access of the data. The non-transitory computer-readable medium 702 includes instructions 748 to transport, by the second specific transport, the second protected data. The non-transitory computer-readable medium 702 includes instructions 750 to receive, by the selected second cloud storage platform, the second protected data.

The non-transitory computer-readable medium 702 includes instructions to determine, by the first specific authenticator, the first specific configuration of the plurality of channels using the cloud connection service. The instructions are to select, by using the first specific authenticator, the first specific transport based on the first specific configuration of the plurality of channels.

In an example, to transmit the first protected data to the selected first cloud storage platform, the non-transitory computer-readable medium 702 includes instructions to determine, by the first specific transport, the first specific configuration of the plurality of channels from the cloud connection service. The non-transitory computer-readable medium 702 includes instructions to transmit, by the first specific transport, the first protected data to the first specific cloud storage platform based on the first specific configuration of the plurality of channels. To transmit the second protected data to the selected second cloud storage platform, the non-transitory computer-readable medium 702 includes instructions to determine, by the second specific transport, the second specific configuration of the plurality of channels from the cloud connection service. The second protected data may be transmitted by the second specific transport to the selected second cloud storage platform based on the second specific configuration of the plurality of channels.

In an example, the non-transitory computer-readable medium 702 includes instructions to connect, by the cloud communication service, each of the plurality of channels to a corresponding repository of the set of repositories of the data integration framework to receive the data therefrom. The plurality of repositories may be a point repository, a history repository, an alarm repository, a model repository, an event repository, a heartbeat repository, a messaging repository, or a back-up repository. The point repository may store live data of the on-premise device and the history repository may store an historical collection of the live data of the on-premise device. The alarm repository may store an abnormal event associated with the on-premise device. The model repository may store data that is to represent a semantic model of the plurality of cloud storage platforms. The event repository may store data corresponding to events other than abnormal event associated with the on-premise device. The heartbeat repository may store data corresponding to health information of the on-premise device. The messaging repository may store data corresponding to an arbitrary message from the on-premise device. The back-up repository may store back-up data corresponding to the on-premise device.

With the present subject matter, the elements that are required for a specific architecture are added in a composable fashion. For instance, whichever elements are required to establish the communication from an on-premise device to a cloud storage platform are chosen and added to form the transmission route without having the re-build the service architecture. If another set of elements are required to establish communication with another cloud storage platform, another set of elements are chosen to compose the cloud connectivity solution to another cloud storage platform. The selection of various elements to establish cloud connectivity solutions to various cloud storage platforms are provided in a single design framework.

Therefore, with the present subject matter, data may be stored in variety of different cloud storage platforms without having to re-build the service architecture. Accordingly, the present subject matter fulfils various organizations' desires to use services across different cloud storage platforms. Further, the present subject matter eliminates the need for inventing higher amount of resources (cost, time, and the like) to enable communication with variety of cloud storage platforms. With the present subject matter, the process of enabling communication with different cloud storage platforms is easier and simple.

Although examples and implementations of present subject matter have been described in language specific to structural features and/or methods, it is to be understood that the present subject matter is not necessarily limited to the specific features or methods described. Rather, the specific features and methods are disclosed and explained in the context of a few example implementations of the present subject matter.

What is claimed is:

1. A universal data transmission (UDT) system, the UDT system comprising:
 a data integration framework operably connected to an on-premise device and comprising a set of repositories, each repository in the set of repositories to store a category of data, wherein the data integration framework is to:
 collect data from the on-premise device; and
 store the data, based on the category of the collected data, into one or more repository in the set of repositories;
 a set of serializers to convert the data collected from the on-premise device into a transmittable format for transportation of the converted data to a plurality of cloud storage platforms;
 a plurality of authenticators to secure the converted data to generate a protected data to prevent unauthorized access of the converted data; and
 a plurality of transports, wherein each transport is to transmit the protected data to the plurality of cloud storage platforms in a transport protocol; and
 a cloud connection service operationally coupled to the data integration framework and to the plurality of cloud storage platforms, the cloud connection service being capable of loading the collected data to each of the plurality of cloud storage platforms, wherein the cloud connection service is to:
 receive a selection of a cloud storage platform from the plurality of cloud storage platforms for the cloud connection service to load the collected data,
 configure a plurality of channels based on the category of the collected data and the selected cloud storage platform to a specific configuration, wherein the specific configuration of the plurality of channels is to indicate a transmission route for transmission of the collected data from the on-premise device to the selected cloud storage platform, each of the plurality of channels being connected to a corresponding repository from the set of repositories, and select a specific serializer from amongst the set of serializers, a specific authenticator from amongst the plurality of authenticators, and a specific transport from amongst the plurality of transports, wherein the specific serializer, the specific authenticator, and the specific transport are pluggable to form the transmission route connecting the on-premise device to the selected cloud storage platform.

2. The UDT system of claim 1, wherein when the protected data is to be transmitted to the selected cloud storage platform:
 the specific serializer is selectable by each of the plurality of channels and is to convert the collected data received from a corresponding channel into the transmittable format for transportation to the selected cloud storage platform;

the specific authenticator is selectable by the specific serializer and is to secure the converted data received from the specific serializer to generate the protected data; and the specific transport is selectable by the specific authenticator and is to transmit the protected data received from the specific authenticator to the selected cloud storage platform.

3. The UDT system of claim 1, wherein the cloud connection service has an associated messaging protocol that is linked to a messaging protocol of the selected cloud storage platform.

4. The UDT system of claim 1, wherein the data integration framework is a common object model framework.

5. The UDT system of claim 1, wherein the plurality of channels comprises:

a point channel to enable delivery of live data of the on-premise device, a history channel to enable delivery of an historical collection of live data of the on-premise device, an alarm channel to enable delivery of data corresponding to an abnormal event associated with the on-premise device, a command channel to receive and process commands from the plurality of cloud storage platforms, a model channel to represent semantic model to the plurality of cloud storage platforms, an event channel to enable delivery of data corresponding to events other than abnormal event associated with the on-premise device, a heartbeat channel to enable delivery of data corresponding to health information of the on-premise device, a messaging channel to enable delivery of arbitrary message, a back-up channel to enable delivery of back-up of data corresponding to the on-premise device; and a schedule channel to synchronize schedule and calendar configuration from the on-premise device up to the plurality of cloud storage platforms for visualization and configuration thereof.

6. The UDT system of claim 1, wherein the plurality of cloud storage platforms comprises a private cloud platform, a public cloud platform, a hybrid cloud platform, a community cloud platform, or a combination thereof.

7. The UDT system of claim 1, wherein the transport protocol is one of: Message Queuing Telemetry Transport (MQTT) protocol, Hyper Text Transfer Protocol (HTTP), Advanced Message Queuing Protocol (AMQP), Data Distributed Service (DDS) protocol, Extensible Messaging and Presence Protocol (XMPP), and Constrained Application Protocol (CoAP).

8. The UDT system of claim 1, wherein the plurality of authenticators is one of: certificate-based authenticator, Raw Public Key (RPK)-based authenticator, password-based authenticator, multi-factor authenticator, or a combination thereof.

9. The UDT system of claim 1, wherein the specific transport comprises an interface to facilitate determination of the specific configuration of the plurality of channels from the cloud connection service, and wherein the specific transport is to transmit the protected data to the selected cloud storage platform based on the specific configuration of the plurality of channels.

10. The UDT system of claim 9, wherein the interface is a java-based interface.

11. A method for universally transmitting data to a plurality of cloud storage platforms, the method comprising:

transmitting, by an on-premise device, data to a data integration framework, wherein the data integration framework comprises a set of repositories, each repository in the set of repositories to store a category of data;

collecting, by the data integration framework, the data from the on-premise device;

storing, by the data integration framework, the data that is collected from the on-premise device based on category of the data into one or more repository in the set of repositories;

receiving, by a cloud connection service, a selection of a first cloud storage platform from the plurality of cloud storage platforms for the cloud connection service to load the data collected from the on-premise device, wherein the cloud connection service is operationally coupled to the data integration framework and the plurality of cloud storage platforms, configuring, by the cloud connection service, a plurality of channels to a first specific configuration based on the category of data and the selected first cloud storage platform, wherein the first specific configuration is to indicate a first transmission route for transportation of the data collected from the on-premise device to the selected first cloud storage platform, selecting, by the cloud connection service, a first specific serializer from amongst a plurality of serializers, a first specific authenticator from amongst a plurality of authenticators, and a first specific transport from amongst a plurality of transports, wherein the first specific serializer, the first specific authenticator, and the first specific transport are pluggable to form the first transmission route connecting the on-premise device to the selected first cloud storage platform;

connecting, by the cloud connection service, each of the plurality of channels to a corresponding repository of set of repositories of the data integration framework to receive the stored data therefrom;

converting, by the first specific serializer, the collected data received from the plurality of channels into a first transmittable format for transportation to the selected first cloud storage platform;

securing, by the first specific authenticator, the converted data received from the first specific serializer to generate a first protected data to prevent unauthorized access of the converted data;

transporting, by the first specific transport, the first protected data;

receiving, by the selected first cloud storage platform, the first protected data;

receiving, by the cloud connection service, a selection of a second cloud storage platform from the plurality of cloud storage platforms for the cloud connection service to load the data collected from the on-premise device;

re-configuring, by the cloud connection service, the plurality of channels to a second specific configuration based on the category of data and the selected second cloud storage platform, wherein the second specific configuration is to indicate a second specific transmission route for transportation of the data collected from the on-premise device to the selected second cloud storage platform;

selecting, by the cloud connection service, a second specific serializer from amongst the plurality of serializers, a second specific authenticator from amongst the plurality of authenticators, and a second specific transport from amongst the plurality of transports, wherein the second specific serializer, the second specific authenticator, and the second specific transport are pluggable to form the second specific transmission route connecting the on-premise device to the selected second cloud storage platform;

receiving, by the plurality of channels, data stored in the corresponding repository of the set of repositories, wherein the stored data being collected from the on-premise device by the data integration framework;

converting, by the second specific serializer, the collected data received from the plurality of channels into a second transmittable format for transportation to the selected second cloud storage platform;

securing, by the second specific authenticator, the converted data received from the second specific serializer to generate a second protected data to prevent the unauthorized access of the converted data;

transporting, by the second specific transport, the second protected data; and receiving, by the selected second cloud storage platform, the second protected data.

12. The method of claim 11, wherein prior to configuring the plurality of channels, the method comprises:

linking an associated messaging protocol of the cloud connection service to a messaging protocol of the selected first cloud storage platform.

13. The method of claim 11, wherein prior to the re-configuring the plurality of channels, the method comprises:

linking an associated messaging protocol of the cloud connection service with a messaging protocol of the selected second cloud storage platform.

14. The method of claim 11, comprising:

determining, by the first specific serializer, the first specific configuration of the plurality of channels from the cloud connection service; and selecting, by the first specific serializer, the first specific authenticator based on the first specific configuration of the plurality of channels.

15. The method of claim 11, comprising:

determining, by the second specific serializer, the second specific configuration of the plurality of channels from the cloud connection service; and selecting, by the second specific serializer, the second specific authenticator based on the second specific configuration of the plurality of channels.

16. The method of claim 11, wherein the first transmittable format and the second transmittable format comprises an Extensible Markup Language (XML) format, JavaScript Object Notation (JSON) format, Binary Javascript Object Notation (BSON) format, Yet Another markup Language (YAML) formal, Message Pack format, protobuf format, or a combination thereof.

17. A non-transitory computer-readable medium comprising instructions for universally transmitting data collected from an on-premise device, to a plurality of cloud storage platforms, the instructions being executable by a processing resource to:

collect, by a data integration framework, the data from the on-premise device, wherein the data integration framework is operably connected to the on-premise device, wherein the data integration framework comprises a set of repositories, each repository in the set of repositories to store a category of data;

store, by the data integration framework, the data collected from the on-premise device, based on the category of the collected data, into one or more repository in the set of repositories;

receive, by a cloud connection service, a selection of a first cloud storage platform to load the data collected from the on-premise device, wherein the cloud connection service is operationally coupled to the data integration framework and to the plurality of cloud storage platforms;

link an associated messaging protocol of the cloud connection service to a messaging protocol of the selected first cloud storage platform;

configure, by the cloud connection service, a plurality of channels to a first specific configuration based on the category of data and the selected first cloud storage platform, wherein the first specific configuration is to indicate a first transmission route for transportation of the data collected from the on-premise device to the selected first cloud storage platform;

select, by the cloud connection service, a first specific serializer from amongst a plurality of serializers, a first specific authenticator from amongst a plurality of authenticators, and a first specific transport from amongst a plurality of transports, wherein the first specific serializer, the first specific authenticator, and the first specific transport are pluggable to form the first transmission route connecting the on-premise device to the selected first cloud storage platform;

convert, by the first specific serializer, the data stored in the one or more repository, received from the plurality of channels into a first transmittable format for transportation to the selected first cloud storage platform;

secure, by the first specific authenticator, the converted data received from the first specific serializer to generate a first protected data to prevent unauthorized access of the converted data;

transport, by the first specific transport, the first protected data;

receive, by using the first cloud storage platform, the first protected data;

receive, by the cloud connection service, a selection of a second cloud storage platform from the plurality of cloud storage platforms for the cloud connection service to load the collected data;

link the associated messaging protocol of the cloud connection service to a messaging protocol of the selected second cloud storage platform;

re-configure, by the cloud connection service, the plurality of channels to a second specific configuration based on the category of data and the selected second cloud storage platform, wherein the second specific configuration is to indicate a second transmission route for transportation of the collected data from the on-premise device to the selected second cloud storage platform;

select, by the cloud connection service, a second specific serializer from amongst the plurality of serializers, a second specific authenticator from amongst the plurality of authenticators, and a second specific transport from amongst the plurality of transports, wherein the second specific serializer, the second specific authenticator, and the second specific transport are pluggable to form the second transmission route connecting the on-premise device to the selected second cloud storage platform;

receive, by the plurality of channels, the data stored in the corresponding repository in the set of repositories of the set of repositories, wherein the stored data being collected from the on-premise device by the data integration framework;

convert, by the second specific serializer, the collected data, received from the plurality of channels into a second transmittable format for transportation to the selected second cloud storage platform;

secure, by the second specific authenticator, the converted data received from the second specific serializer to generate a second protected data to prevent the unauthorized access of the converted data;

transport, by the second specific transport, the second protected data; and receive, by the selected second cloud storage platform, the second protected data.

18. The non-transitory computer-readable medium of claim 17, the instructions being executable by the processing resource to:

determine, by the first specific authenticator, the first specific configuration of the plurality of channels using the cloud connection service; and select, by using the first specific authenticator, the first specific transport based on the first specific configuration of the plurality of channels.

19. The non-transitory computer-readable medium of claim 17, wherein to transmit the first protected data to the selected first cloud storage platform, the instructions being executable by the processing resource to:

determine, by the first specific transport, the first specific configuration of the plurality of channels from the cloud connection service; and transmit, by the first specific transport, the first protected data to the first specific cloud storage platform based on the first specific configuration of the plurality of channels, and wherein to transmit the second protected data to the selected second cloud storage platform, the instructions are being executable by the processing resource to:

determine, by the second specific transport; the second specific configuration of the plurality of channels from the cloud connection service; and transmit, by the second specific transport, the second protected data to the selected second cloud storage platform based on the second specific configuration of the plurality of channels.

20. The non-transitory computer-readable medium of claim 17, the instructions are executable by the processing resource to:

connect, by the cloud connection service, each of the plurality of channels to the corresponding repository of the set of repositories of the data integration framework to receive the stored data therefrom, wherein the set of repositories is one of: a point repository, a history repository, an alarm repository, a model repository, an event repository, a heartbeat repository, a messaging repository, a command repository, and a back-up repository, wherein:

the point repository is to store live data of the on-premise device, the history repository is to store an historical collection of live data of the on-premise device, the alarm repository is to store an abnormal event associated with the on-premise device, the model repository is to store data that is to represent a semantic model of the plurality of cloud storage platforms, the event repository is to store data corresponding to events other than abnormal event associated with the on-premise device, the heartbeat repository is to store data corresponding to health information of the on-premise device, the messaging repository is to store data corresponding to an arbitrary message from the on-premise device, the command repository is to store commands from the plurality of cloud storage platforms to the on-premise device, and the back-up repository is to store back-up data corresponding to the on-premise device.

* * * * *